United States Patent
MacCready et al.

(10) Patent No.: US 10,310,518 B2
(45) Date of Patent: Jun. 4, 2019

(54) SWARM AUTOPILOT

(71) Applicant: APIUM INC., Glendale, CA (US)

(72) Inventors: Tyler MacCready, Pasadena, CA (US); Sankaran Ramakrishnan, Glendale, CA (US); Thomas Zambrano, Long Beach, CA (US)

(73) Assignee: Apium Inc., Glendale, CA (US)

( * ) Notice: Subject to any disclaimer, the term of this patent is extended or adjusted under 35 U.S.C. 154(b) by 90 days.

(21) Appl. No.: 15/260,224

(22) Filed: Sep. 8, 2016

(65) Prior Publication Data

US 2017/0068243 A1 Mar. 9, 2017

Related U.S. Application Data

(60) Provisional application No. 62/216,166, filed on Sep. 9, 2015.

(51) Int. Cl.
*G05B 19/418* (2006.01)
*G05D 1/10* (2006.01)
*G05D 1/02* (2006.01)

(52) U.S. Cl.
CPC .......... *G05D 1/104* (2013.01); *G05D 1/0206* (2013.01); *Y10S 901/01* (2013.01)

(58) Field of Classification Search
CPC ..... G05D 1/0206; G05D 1/104; Y10S 901/01
See application file for complete search history.

(56) References Cited

U.S. PATENT DOCUMENTS

| | | | |
|---|---|---|---|
| 5,521,817 | A | 5/1996 | Burdoin et al. |
| 6,842,674 | B2 | 1/2005 | Solomon |
| 6,904,335 | B2 | 6/2005 | Solomon |
| 7,047,861 | B2 | 5/2006 | Solomon |
| 7,082,351 | B2 | 7/2006 | Hara et al. |
| 7,283,893 | B2 | 10/2007 | Hara et al. |
| 7,343,222 | B2 | 3/2008 | Solomon |

(Continued)

OTHER PUBLICATIONS

"Robot Path Planning Using Simulated Annealing" by Tsuzuki, M. et al, May 17, 2006.*

(Continued)

*Primary Examiner* — Harry Y Oh
(74) *Attorney, Agent, or Firm* — Lewis Roca Rothgerber Christie LLP

(57) ABSTRACT

A system and method for generating an artificial topography in a distributed array of robotic agents. Each robotic agent stores, and periodically updates a parameter value or "A-value" in accordance with a process including, e.g., averaging neighboring A-values, received from close neighbor robotic agents, biasing the A-value based on external commands or measured environmental parameters, and decreasing the A-value by a cooling rate factor. Averaging among neighboring robotic agents results eventually in a globally smoothed distribution of A-values. A gradient may be estimated for the distribution of A-values, and the robotic agents may be programmed to move in the direction of the gradient, toward increasing A-values. This behavior may be employed to cause the robotic agents to follow a robotic agent with a fixed, relatively large, A-value, or, if the A-values are biased by features (e.g., gradients or steps) in environmental parameters, to converge on such features.

13 Claims, 26 Drawing Sheets

Communication range of agent $X_0$

(56) References Cited

U.S. PATENT DOCUMENTS

| | | | |
|---|---|---|---|
| 7,409,266 | B2 | 8/2008 | Hara et al. |
| 7,642,953 | B2 | 1/2010 | Cheng et al. |
| 7,970,493 | B2 | 6/2011 | Kim et al. |
| 8,060,270 | B2 | 11/2011 | Vian et al. |
| 8,112,176 | B2 | 2/2012 | Solomon |
| 8,186,589 | B2 | 5/2012 | Ben Asher et al. |
| 8,234,067 | B2 | 7/2012 | Bauer et al. |
| 8,290,619 | B2 | 10/2012 | McLurkin et al. |
| 8,379,967 | B1 | 2/2013 | Bush et al. |
| 8,543,255 | B2 | 9/2013 | Wood et al. |
| 8,547,854 | B2 * | 10/2013 | Zummo ............... H04L 41/145 370/242 |
| 8,788,121 | B2 | 7/2014 | Klinger |
| 8,838,271 | B2 | 9/2014 | Ghose et al. |
| 8,892,253 | B2 | 11/2014 | Park et al. |
| 9,043,021 | B1 | 5/2015 | Clark et al. |
| 9,102,406 | B2 | 8/2015 | Stark et al. |
| 9,104,201 | B1 | 8/2015 | Pillai et al. |
| 2004/0030448 | A1 | 2/2004 | Solomon |
| 2004/0030449 | A1 | 2/2004 | Solomon |
| 2004/0030450 | A1 | 2/2004 | Solomon |
| 2004/0030570 | A1 | 2/2004 | Solomon |
| 2004/0030571 | A1 | 2/2004 | Solomon |
| 2004/0068351 | A1 | 4/2004 | Solomon |
| 2004/0068415 | A1 | 4/2004 | Solomon |
| 2004/0068416 | A1 | 4/2004 | Solomon |
| 2004/0134336 | A1 | 7/2004 | Solomon |
| 2005/0183569 | A1 | 8/2005 | Solomon |
| 2006/0079997 | A1 | 4/2006 | McLurkin et al. |
| 2006/0085106 | A1 | 4/2006 | Gaudiano et al. |
| 2007/0093946 | A1 | 4/2007 | Gideoni |
| 2007/0288132 | A1 | 12/2007 | Lam |
| 2008/0241264 | A1 | 10/2008 | Solomon |
| 2008/0260141 | A1 * | 10/2008 | Givens ............... H04M 9/082 379/406.08 |
| 2010/0163621 | A1 | 7/2010 | Ben-Asher et al. |
| 2011/0135189 | A1 | 6/2011 | Lee |
| 2012/0036198 | A1 * | 2/2012 | Marzencki ......... H04L 61/6081 709/206 |
| 2012/0109600 | A1 * | 5/2012 | Saeed ..................... G06F 17/10 703/2 |
| 2013/0110478 | A1 * | 5/2013 | Saeed .................. G06K 9/6293 703/2 |
| 2013/0123981 | A1 | 5/2013 | Lee et al. |
| 2013/0289858 | A1 | 10/2013 | Mangiat et al. |
| 2014/0269989 | A1 * | 9/2014 | Santucci ............. H04B 1/0475 375/296 |
| 2015/0117299 | A1 * | 4/2015 | Zhang ................ H04L 25/0256 370/315 |
| 2015/0301529 | A1 | 10/2015 | Pillai et al. |

OTHER PUBLICATIONS

Distributed Sensor Fusion for Scalar Field Mapping Using Mobile Sensor Networks by La, H. et al., Apr. 2013.*
International Search Report and Written Opinion for corresponding Application No. PCT/US16/51002, dated Feb. 7, 2017 (9 pages).
La, et al. "Distributed Sensor Fusion for Scalar Field Mapping Using Mobile Sensor Networks," IEEE Transactions on Cybernetics, vol. 43, No. 2, Apr. 2013, pp. 766-778.
Schwager, M. "A Gradient Optimization Approach to Adaptive Multi-Robot Control," Massachusetts Institute of Technology, Aug. 26, 2009, (3 pages).
Tsuzuki, M., et al. "Robot Path Planning Using Simulated Annealing," INCOM'2006: 12th IFAC/IFIP/IFORS/IEEE/IMS Symposium, May 17, 2006 (6 pages).

* cited by examiner

| Agent | East-West | North-South | T | C | A |
|---|---|---|---|---|---|
| | (meters) | (meters) | (Celsius) | | |
| $X_0$ | 0 | 0 | 19 | N | 0.5 |
| $X_1$ | -11 | 43 | 19.9 | N | 0.81 |
| $X_2$ | 28 | 34 | 22.2 | N | 0.75 |
| $X_3$ | 23 | 15 | 21 | N | 0.66 |
| $X_4$ | 32 | -18 | 20.8 | N | 0.35 |
| $X_5$ | 26 | -25 | 19.6 | N | 0.29 |
| $X_6$ | -20 | -36 | 16 | Y | 0.2 |
| $X_7$ | -36 | -10 | 16.2 | Y | 0.42 |
| $X_8$ | -15 | 7 | 18.3 | Y | 0.6 |

*FIG. 3*

SWARM AUTOPILOT

CROSS-REFERENCE TO RELATED APPLICATION(S)

The present application claims priority to and the benefit of U.S. Provisional Application No. 62/216,166, filed Sep. 9, 2015, entitled "SWARM AUTOPILOT", the entire content of which is incorporated herein by reference.

FIELD

One or more aspects of embodiments according to the present invention relate to robotic agents, and more particularly to a system and method for controlling a swarm of robotic agents.

BACKGROUND

In various situations, groups or "swarms" of mobile robotic agents may operate together, e.g., to accomplish a task as a group. In such a situation it may be impractical for one or more human operators to control the motion of each robotic agent individually. If the completion of a task involves more than rudimentary behavior, centralized control may have disadvantages, such as the potential for a communications bottleneck at the central controller, and pre-programmed behavior may be poorly suited for having the swarm move in response to information obtained in real time, e.g., by the robotic agents themselves.

Thus, there is a need for an improved system and/or method for controlling the motion of a swarm of robotic agents.

SUMMARY

Aspects of embodiments of the present disclosure are directed toward a system and/or method for generating an artificial topography in a distributed array of robotic agents. Each robotic agent stores, and periodically updates a parameter value or "A-value" in accordance with a process including, e.g., averaging neighboring A-values, received from close neighbor robotic agents, biasing the A-value based on external commands or measured environmental parameters, and decreasing the A-value by a cooling rate factor. Averaging among neighboring robotic agents results eventually in a globally smoothed distribution of A-values. A local gradient may be estimated for the distribution of A-values, and the robotic agents may be programmed to move in the direction of the gradient, toward increasing A-values. This behavior may be employed to cause the robotic agents to follow a robotic agent with a fixed, relatively large, A-value, or, if the A-values are biased by features (e.g., gradients or steps) in environmental parameters, to converge on such features.

According to an embodiment of the present invention there is provided a method for controlling a plurality of robotic agents, the method including: storing, in each of the robotic agents, a respective first parameter value; sending, by a first robotic agent of the plurality of robotic agents, the respective first parameter value to each of a plurality of first close neighbor robotic agents of the plurality of robotic agents, each of the first close neighbor robotic agents having a distance, to the first robotic agent, less than a threshold distance; receiving, by the first robotic agent, a respective first parameter value from each of the first close neighbor robotic agents, calculating, by the first robotic agent, a new first parameter value, the calculating including calculating an average of: the first parameter value of the first robotic agent; and the received first parameter values; updating the first parameter value of the first robotic agent to equal the new first parameter value; calculating, by the first robotic agent, an estimated gradient of: the first parameter value of the first robotic agent; and the received first parameter values; calculating, by the first robotic agent, a resultant virtual force vector as a sum of one or more vector quantities including the estimated gradient; and generating, by the first robotic agent, a net thrust force, on the first robotic agent, parallel to the resultant virtual force vector.

In one embodiment, the method includes setting, by a second robotic agent different from the first robotic agent, the respective first parameter value of the second robotic agent to a value received from a central controller.

In one embodiment, the method includes, moving, by the second robotic agent, in a direction along a path received by the second agent from a central controller.

In one embodiment, each of the robotic agents is configured to measure a first value of an environmental parameter.

In one embodiment, the calculating of the first new parameter value further includes calculating a function of: the average of: the first parameter value of the first robotic agent; and the received first parameter values; and the first value of the environmental parameter.

In one embodiment, the method includes receiving, by the first robotic agent, a respective value of the environmental parameter from each of the first close neighbor robotic agents, wherein the calculating of the first new parameter value further includes calculating a function of: the average of: the first parameter value of the first robotic agent; and the received first parameter values; and the received values of the environmental parameter.

In one embodiment, the function is a weighted sum of: the average of: the first parameter value of the first robotic agent; and the received first parameter values; and a magnitude of an estimated gradient in: the first value of the environmental parameter; and the received values of the environmental parameter.

In one embodiment, the sending of the respective first parameter value includes transmitting the respective first parameter value by wireless communication, and the receiving of the respective first parameter values includes receiving the respective first parameter values by wireless communication.

In one embodiment, the threshold distance is less than or equal to a range of the wireless communication.

In one embodiment, the average is a weighted average.

In one embodiment, the average is a weighted average, each term of the weighted average being weighted in inverse proportion to a distance to a first close neighbor robotic agent, of the plurality of first close neighbor robotic agents, from which the received respective first parameter value was received.

In one embodiment, the calculating of the first new parameter value further includes multiplying by a cooling rate factor, the cooling rate factor being a number greater than 0.01 and less than 0.99.

In one embodiment, the calculating of the first new parameter value further includes calculating, for a first close neighbor robotic agent, of the plurality of first close neighbor robotic agents: a distance between the first robotic agent and the first close neighbor robotic agent; a virtual force vector corresponding to the first close neighbor robotic agent, the virtual force vector having a magnitude that is a function of the distance between the first robotic agent and the first close neighbor robotic agent, and having a direction along a straight line connecting the first robotic agent and the first close neighbor robotic agent, the virtual force vector corresponding to: a repulsive force when the distance between the first robotic agent and the first close neighbor robotic agent is less than an equilibrium distance; and an attractive force when the distance between the first robotic agent and the first close neighbor robotic agent is greater than the equilibrium distance.

According to an embodiment of the present invention there is provided a system including: a plurality of robotic agents, each of the robotic agents being configured to store a respective first parameter value, a first robotic agent of the plurality of robotic agents being further configured to: send its first parameter value to a second robotic agent of the plurality of robotic agents, the second robotic agent having a distance to the first robotic agent less than a threshold distance, receive a respective first parameter value from the second robotic agent; calculate a new first parameter value, the calculating of the new first parameter value including calculating an average of a plurality of values including the first parameter value of the first robotic agent and the received first parameter value; and update the first parameter value of the first robotic agent to equal the new first parameter value.

In one embodiment, the first robotic agent is further configured to: sense a first value of an environmental parameter; and receive a second value of the environmental parameter sensed by the second robotic agent; and calculate an estimated gradient in the environmental parameter based at least in part on the first value and the second value.

In one embodiment, the first robotic agent is configured to calculate the new first parameter value, based further on the estimated gradient.

In one embodiment, the average is a weighted average.

In one embodiment, a third robotic agent of the plurality of robotic agents is further configured to store a constant respective first parameter value.

In one embodiment, the third robotic agent is further configured to follow a prescribed path.

BRIEF DESCRIPTION OF THE DRAWINGS

These and other features and advantages of the present invention will be appreciated and understood with reference to the specification, claims, and appended drawings wherein:

FIG. 3 is a table of values stored by a robotic agent, according to an embodiment of the present invention;

DETAILED DESCRIPTION

Figure 1:
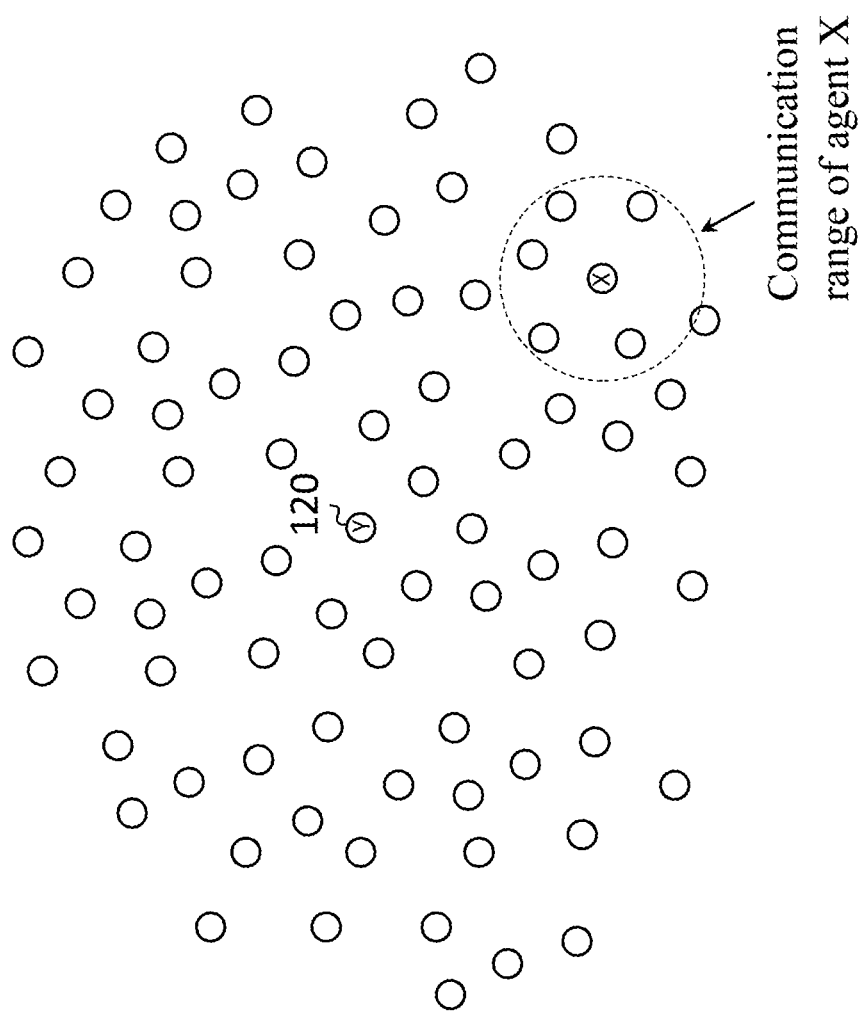
FIG. 1 is a schematic plan view of a swarm of robotic agents, according to an embodiment of the present invention.

The detailed description set forth below in connection with the appended drawings is intended as a description of exemplary embodiments of a swarm autopilot provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Related art methods for controlling a distributed group of robotic agents include methods involving operating by local interaction rules and methods involving developing coherent group behaviors. Controlling a distributed group may be challenging, however. Some control methods may use either centralized control or preprogrammed behavior scenarios, or may provide only rudimentary behaviors.

In some embodiments according to the present invention, an autopilot for distributed systems provides the benefits of having fully distributed robotic agents while assuring nimble adaptation of the group, or "swarm" of robotic agents. The autopilot monitors the state of the system and adjusts the control inputs to bring the system into alignment with a target. In some embodiments, the autopilot is just as distributed as the group of robotic agents it is controlling.

The autopilot may employ a parameter referred to herein as an "A-value". Each robotic agent may have a respective A-value, and each robotic agent may have a system and method of recognizing this value in neighboring robotic agents, a set of response rules specifying how to respond (e.g., how to move in response to) to the A-values of neighboring robotic agents, and a set of update rules for how to update the robotic agent's own A-value based on the A-values of neighboring robotic agents.

At a system level the array of A-values (the array including one A-value for each robotic agent in the swarm) may define an artificial topography. The response rules may relate to moving up or down gradients in this artificial topography. The update rules may relate to smoothing the topography to provide stable gradients and to gradually diffuse local information to the swarm through a distributed network formed of communications links between robotic agents and their close neighbors.

Although the set of A-values may form an array, the A-values may also be treated as sample points in an underlying distribution in a continuous space. A continuous distribution can be smooth, i.e., having well defined derivatives, or non-smooth, e.g., comprising non-differentiable step functions. An underlying distribution that is smooth may facilitate a more stable response to changes in the A-values over time, than a non-smooth distribution.

High-level autopilot commands or instructions may include (e.g., consist of) defining high points and low points in the topography that may then create a coherent system-scale gradient map that may be used to guide the group.

Referring to FIG. 1, in one embodiment each of a plurality of robotic agents includes a communications system enabling the robotic agent to communicate with other robotic agents. The communications system may have a range that enables each robotic agent to communicate with other robotic agents near it, but not with ones that are outside of the range of the communications system (or "communication range"). One of the robotic agents, referred to herein as a "controllable agent" 120 may be configured to communicate directly with a central controller, e.g., a human operator. The collection of robotic agents may be a single entity, i.e., a swarm of robotic agents, in the sense that an unbroken web of intercommunication ties it together. It may also be decentralized in the sense that only a subset of (e.g., one or more of) the robotic agents of the swarm are in direct contact with the central controller. Each of the robotic agents that are not in direct contact with the central controller may respond to (e.g., move in response to) communications exchanged with other robotic agents that are within communication range of the robotic agent, and to information (e.g., sensed information) about the local environment of the robotic agent.

In some embodiments a swarm, such as the swarm illustrated in FIG. 1, is controlled via a swarm autopilot system that involves the central controller (e.g., a human operator) providing simple controls to the controllable agent 120 while the autopilot adapts the rest of the swarm to congregate around the controllable agent 120 as it moves. The autopilot, which may be a distributed algorithm running on hardware distributed amongst all the robotic agents, constantly (e.g., periodically) updates the commands to each robotic agent as its position changes in the swarm and as the shape of the swarm changes. Accordingly, the autopilot coordinates the motion of the other robotic agents around the controllable agent 120, allowing the central controller to control the entire swarm through commands sent to the controllable agent 120.

Figure 2:
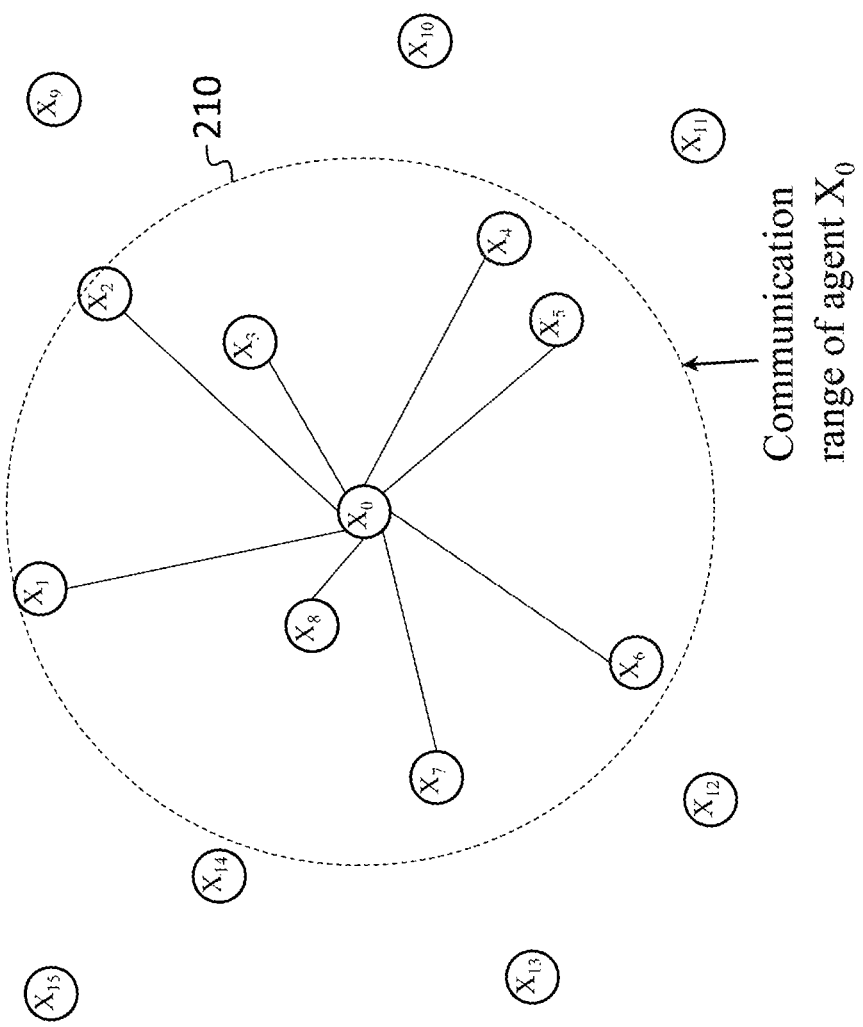
FIG. 2 is a schematic plan view of a portion of a swarm of robotic agents, according to an embodiment of the present invention.

Referring to FIG. 2, in one exemplary configuration, a first robotic agent $X_0$ has a communication range with a first boundary 210 within which are found eight other robotic agents $X_1$-$X_8$. The communication range is the maximum distance over which signals can be transferred between robotic agents. The communication range may limit the range from which the first robotic agent $X_0$ may receive communications from other robotic agents. The communication range may be a range determined by a physical range of radios used for communication, or it may be a range limit imposed by the receiving agent, which may, for example, disregard communications received from outside a set or predetermined range. Accordingly, robotic agent $X_0$ may move in accordance with (or "track") robotic agents $X_1$-$X_8$, but not the other robotic agents in the swarm. The robotic agents $X_0$-$X_8$, may for example be surface vehicles navigating on the surface of a body of water (e.g., an ocean), and each robotic agent may be equipped with a temperature sensor and a chemical sensor capable of detecting the presence of a contaminant.

FIG. 3 includes a table showing the states of the robotic agents $X_0$-$X_8$, each of which has a relative position (defined by an east-west coordinate and a north-south coordinate,) a sensed water temperature (T), and an indication of whether the contaminant is present (C). The relative positions may be calculated, e.g., by robotic agent $X_0$, from respective differences in absolute Global Positioning System (GPS) coordinates, which may for example be obtained from Global Positioning System receivers on the respective robotic agents.

Each robotic agent may be in possession of (e.g., it may store in local memory) information about its position and environment, and information that it has received from neighbors within its communication range, referred to herein as "close" neighbors. The communication system may enable each robotic agent, when it receives information from a close neighbor, to identify (e.g., by a unique identifier identifying the sending robotic agent) the robotic agent from which the information was sent. In one embodiment, the robotic agent $X_0$ maintains or "hosts" a neighbor list including the information of FIG. 3, which includes both information the robotic agent $X_0$ has obtained directly (e.g., the water temperature at robotic agent $X_0$), and information (e.g., the water temperature elsewhere) that it has received from other robotic agents. Some of the information in the neighbor list, such as water temperature, may be gradational; other information, such the indication of whether the contaminant is present, may be discrete. A further parameter (A), referred to herein as an "artificial value" or the "A-value" may be used for implementing the autopilot. Information in the neighbor list may enable the robotic agent to behave as part of the swarm, e.g., to join in collective motion and to benefit from spatially distributed environmental information.

Figure 4A:
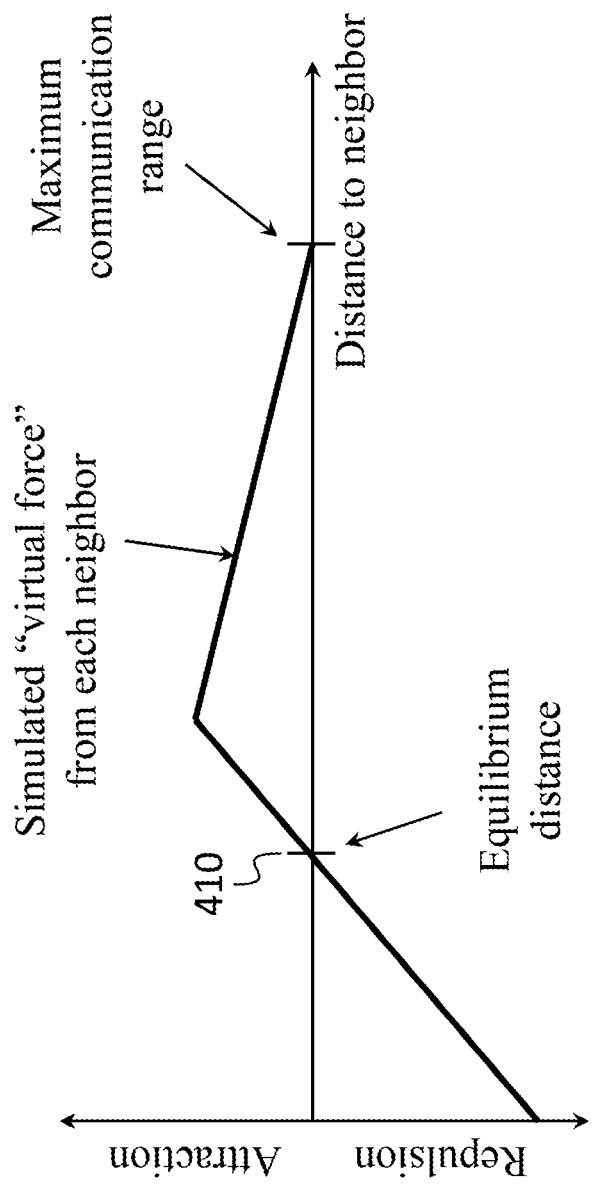
FIG. 4A is a graph of a virtual force as a function of distance, according to an embodiment of the present invention.
Figure 4B:
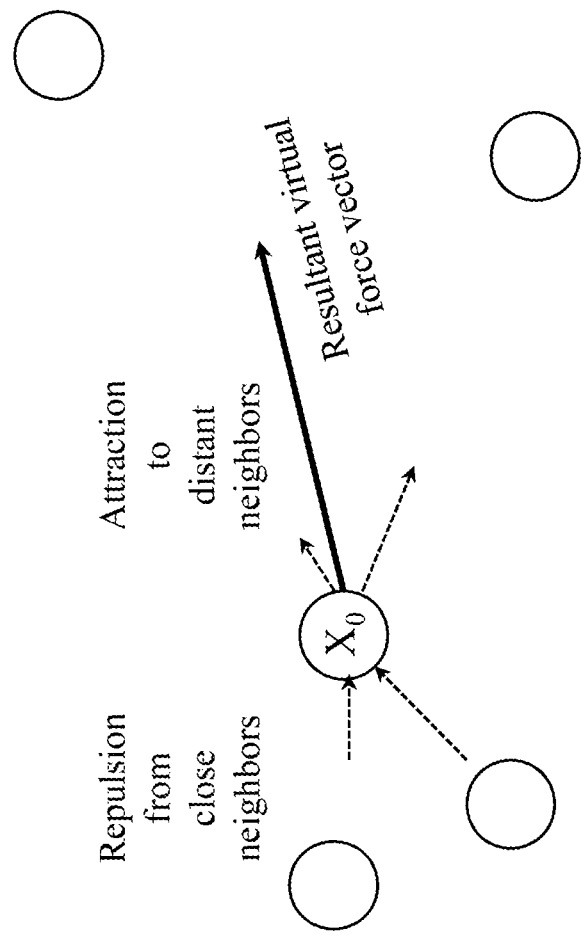
FIG. 4B is a diagram of virtual force vectors, according to an embodiment of the present invention.

Once relative positions are known each robotic agent may use this information to behave according to any of a number of swarm algorithms. Referring to FIGS. 4A and 4B, in one embodiment each of the robotic agents (with the possible exception of the controllable agent) executes a position or motion control algorithm based on a virtual force function. The robotic agent calculates, for each of its close neighbors, a virtual force that is repulsive if the close neighbor is nearer than a threshold distance (or "equilibrium" distance) 410 and that is attractive if the close neighbor is more distant than the equilibrium distance 410. The force may have, for example, the functional form illustrated in FIG. 4A. The robotic agent then calculates a vector virtual force along the straight line connecting it with the close neighbor. The robotic agent repeats this calculation for each of the close neighbors, takes (as illustrated in FIG. 4B) the vector sum of all of the virtual forces calculated (the vector sum being referred to herein as the "resultant virtual force vector"), and moves in the direction of the resultant virtual force vector. For example, the robotic agent may employ a thruster to exert, on its surroundings—e.g., on the water—a physical force equal in magnitude to the resultant virtual force vector, and opposite in direction, and, as a result, generate a thrust force proportional to the resultant virtual force vector, acting on the robotic agent. The cumulative result of all the individual robotic agents' actions may be a distribution of robotic agents having a consistent density across the entire swarm, forming a relatively uniform and cohesive global arrangement (as illustrated, for example, in FIG. 1).

Figure 5A:
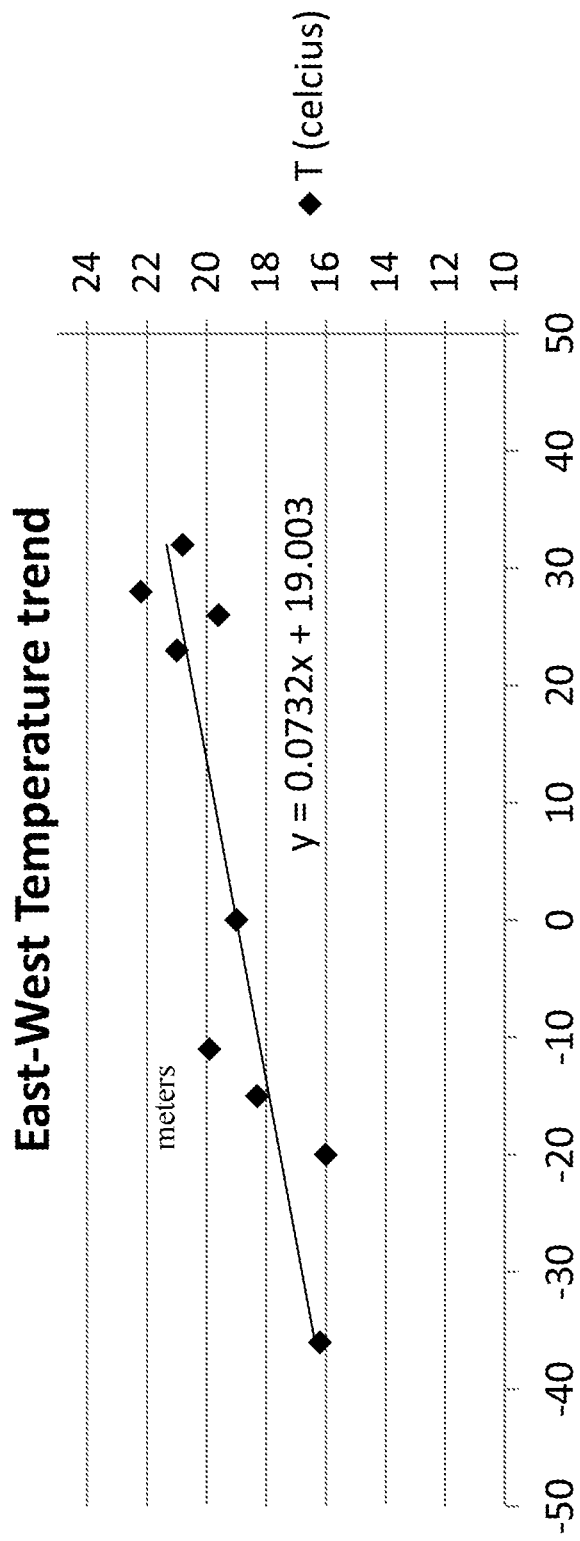
FIG. 5A is a graph of temperature as a function of an east-west coordinate, according to an embodiment of the present invention.
Figure 5B:
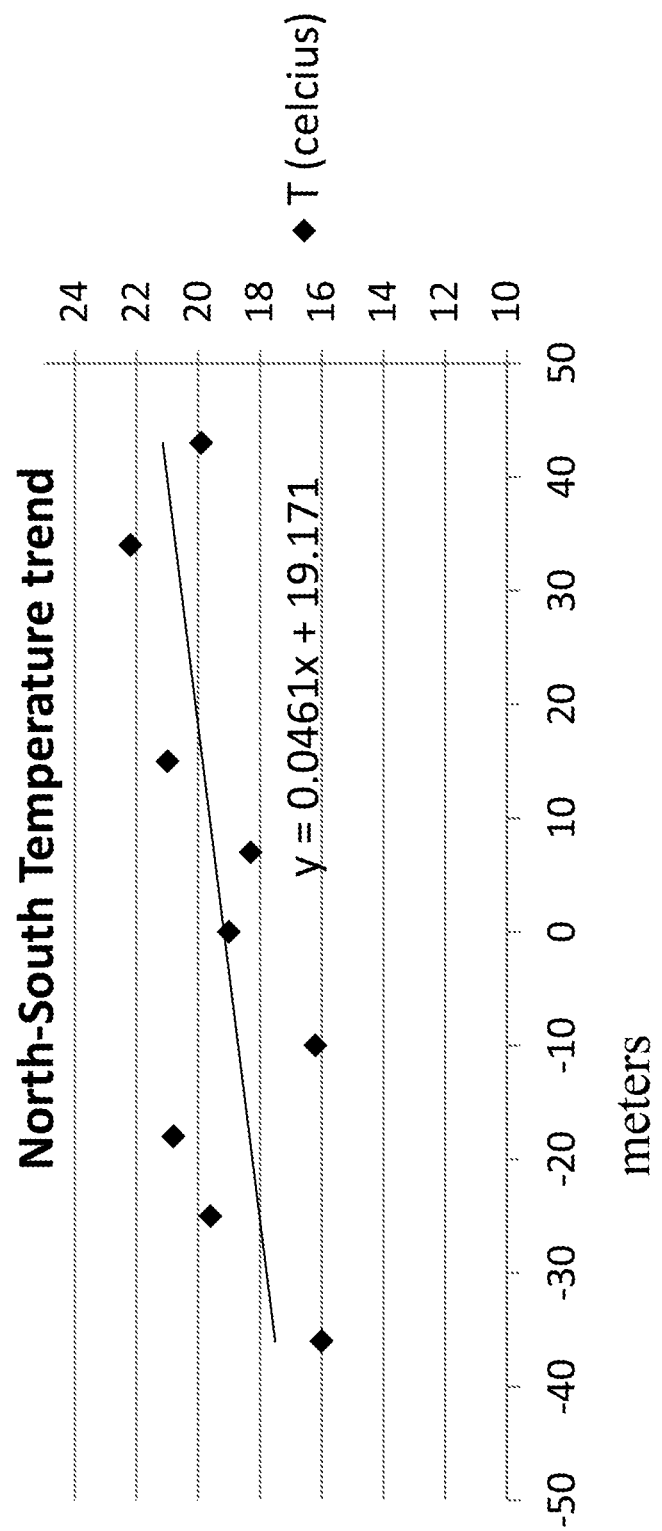
FIG. 5B is a graph of temperature as a function of a north-south coordinate, according to an embodiment of the present invention.
Figure 5C:
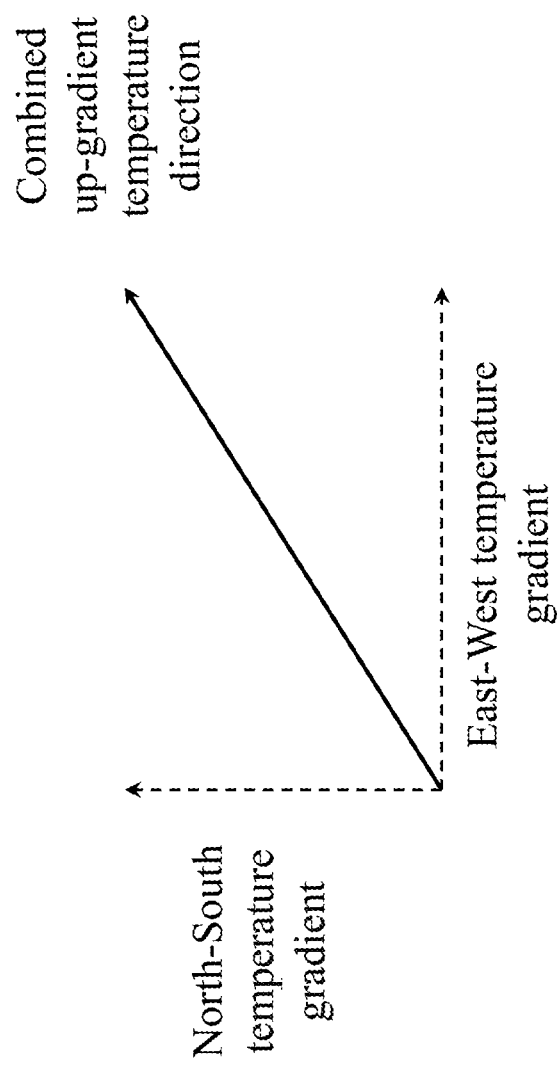
FIG. 5C is a vector diagram of an estimated temperature gradient vector, according to an embodiment of the present invention.

In some embodiments the swarm forms a distributed sensor array. Each robotic agent may measure an environmental characteristic (e.g., temperature), and by comparing environmental measurements with those obtained by, e.g., close neighbors, a robotic agent may estimate, and respond to, variations or gradients in the environment that may be challenging for any single robotic agent to detect. For example, referring to FIGS. 5A-5C, using the data shown in FIG. 3, a least-squares fit of the temperature trends in orthogonal directions may produce a functional estimate of the absolute direction toward higher temperature. This direction may be used as a command input (instead of, or in addition to, the resultant virtual force vector described above) to drive the robotic agent. If each robotic agent follows this same technique, the swarm as a whole may migrate toward higher temperatures using its distributed sensing capability without the need for a central coordinator.

Following gradients in the environment is one way for a swarm to behave collectively. The decentralized nature of the group is not a problem in this case because the controlling inputs, e.g. temperature measurements, are distributed. In embodiments in which the intent is for the swarm to follow control inputs provided by a central controller (which may be in direct communication with only a subset of the robotic agents, e.g., with only one or a small number of the robotic agents), other methods may be employed.

In one embodiment of an autopilot, a "swarm-the-attractor" behavior involves no additional robotic agent capabilities over those described above. This autopilot may automate a task that requires constant monitoring and adjustment. In one embodiment, the swarm as a whole, regardless of size, groups around a single robotic agent, referred to herein as an "attractor", which may be controlled by a human operator or may be sent on a programmed, autonomous mission. Such a task may ordinarily be challenging because the individualized objective for each member of the group (e.g., moving toward the attractor) is a different instruction for each robotic agent depending on its location. Also, in some embodiments, robotic agents that are distant from the attractor may have no direct knowledge of which robotic agent is the attractor or where the attractor is.

The A-value (an artificial number, as mentioned above) may be used to accomplish this task. The A-value may be passed between robotic agents just like any other parameter, and the respective A-values of the robotic agents of the swarm may be used as data points from which local gradients may be calculated. Such gradients may be used to guide the behavior of the swarm in predictable and controllable ways. In some embodiments an autopilot using the A-value has two principal elements: (i) a method for creating a stable gradient in A-values sloping up toward the attractor, and (ii) a method for each robotic agent to calculate this gradient based on measurements from its close neighbors and to respond with a motive force in the up-gradient direction.

Figure 6A:
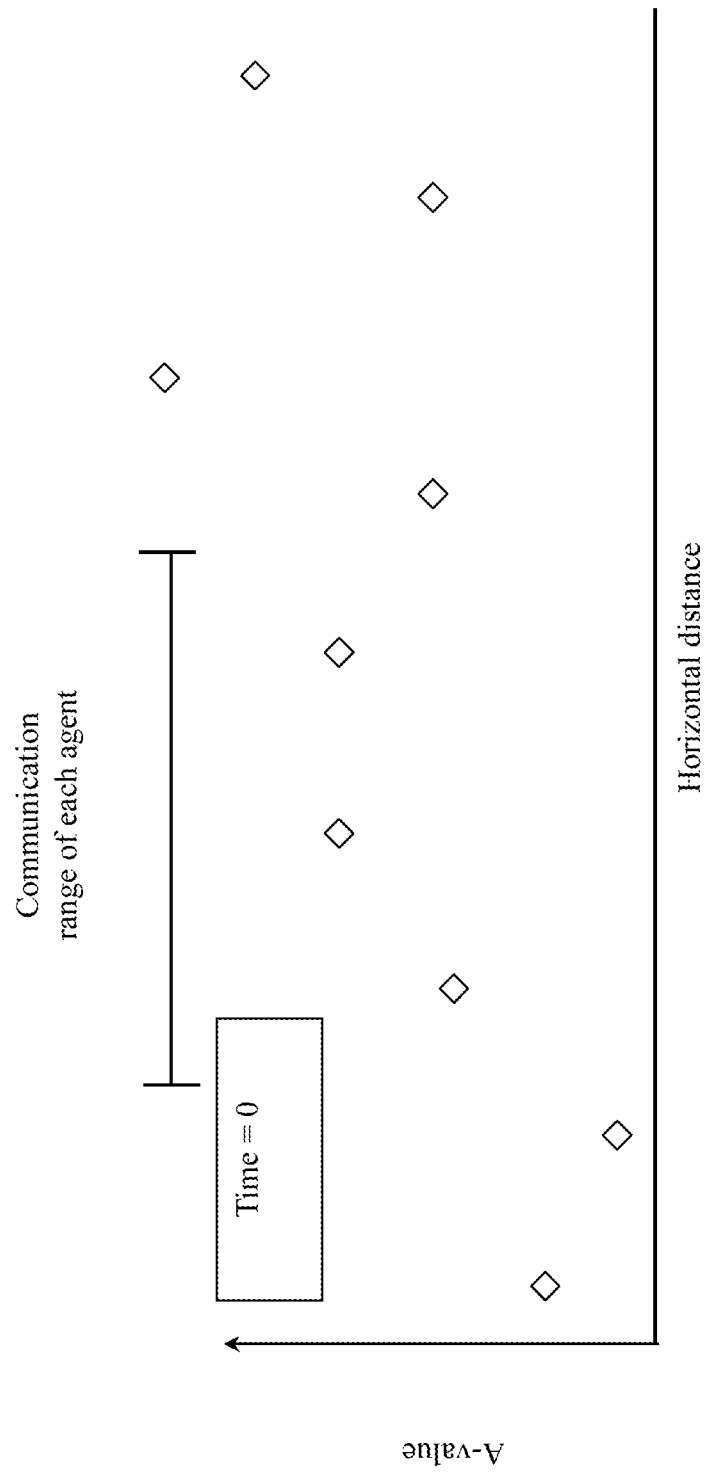
FIG. 6A is a graph of a parameter value as a function of distance, at a first point in time, according to an embodiment of the present invention.
Figure 6B:
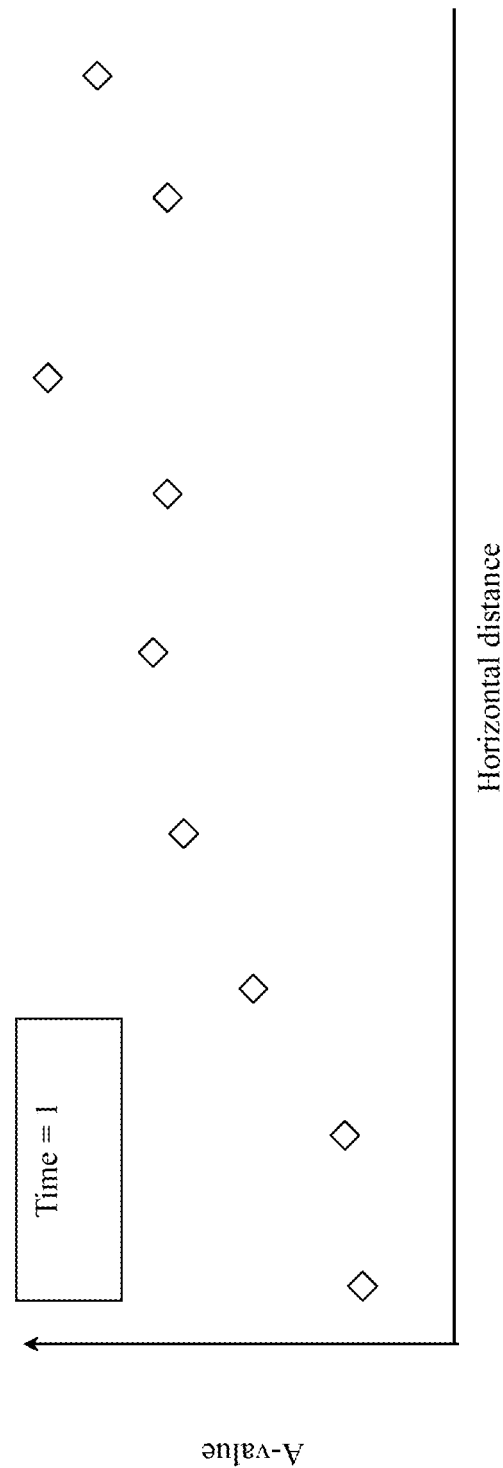
FIG. 6B is a graph of a parameter value as a function of distance, at a second point in time, according to an embodiment of the present invention.
Figure 6C:
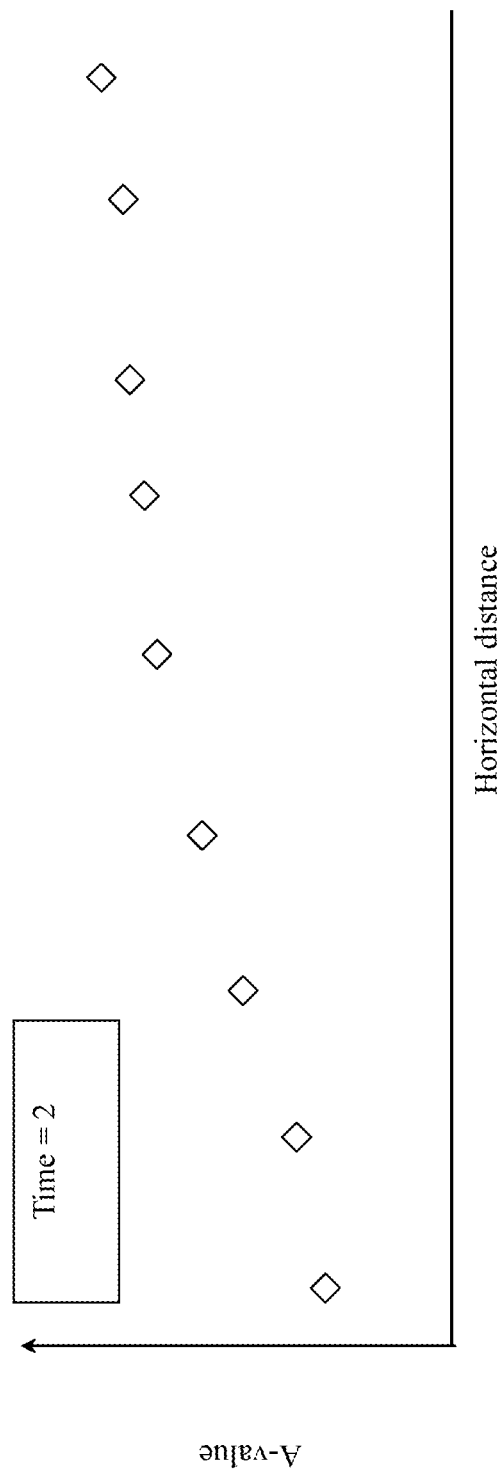
FIG. 6C is a graph of a parameter value as a function of distance, at a third point in time, according to an embodiment of the present invention.

The stable gradient in A-values may be created through a simulated diffusion process, which may be analogous to the diffusion of heat from a local source out through a cooling medium. A-values may diffuse through the group as a result of each robotic agent's repeatedly and continuously sending its A-value to its close neighbors, and updating its A-value to be the average of its close neighbors' A-values. This process may result in the A-values within the entire swarm converging to respective stable "equilibrium" values. FIGS. 6A-6C show a one-dimensional representation of how A-values may evolve in time due to averaging, in one example. At Time=0 (FIG. 6A) the A-values are scattered. Each robotic agent then receives the A-value of its close neighbors. At Time=1 (FIG. 6B) each robotic agent calculates the average of (i) its own A-value and (ii) the A-values of its close neighbors and replaces its A-value with this calculated average. Each iteration of such averaging may result in a smoother set of A-values, as may be seen from the set of A-values shown for Time=2 (FIG. 6C). The average used may be a straight average, or it may be a weighted average (e.g., a weighted average in which the A-values of the more distant ones of a robotic agent's close neighbors are weighted less heavily than the closer ones of a robotic agent's close neighbors).

Figure 7A:
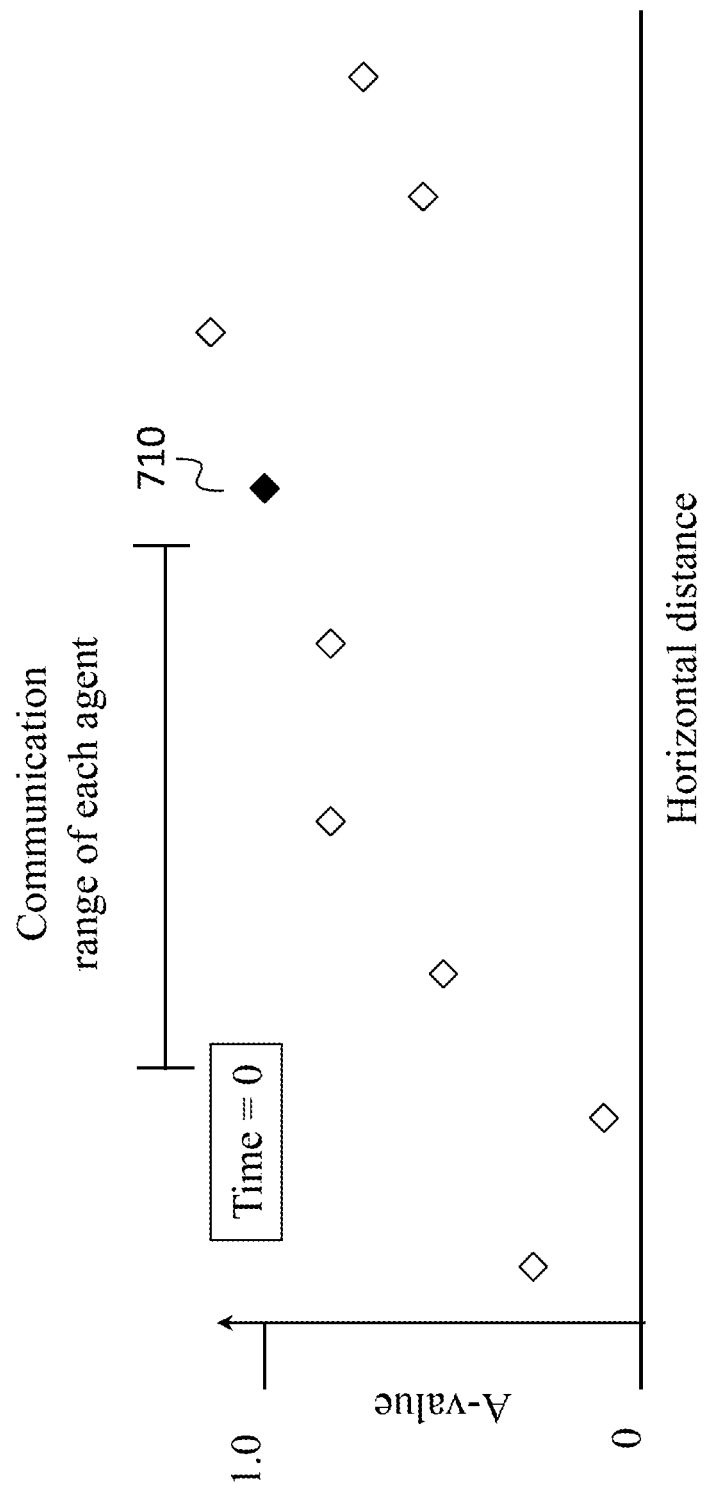
FIG. 7A is a graph of a parameter value as a function of distance, at a first point in time, according to an embodiment of the present invention.
Figure 7B:
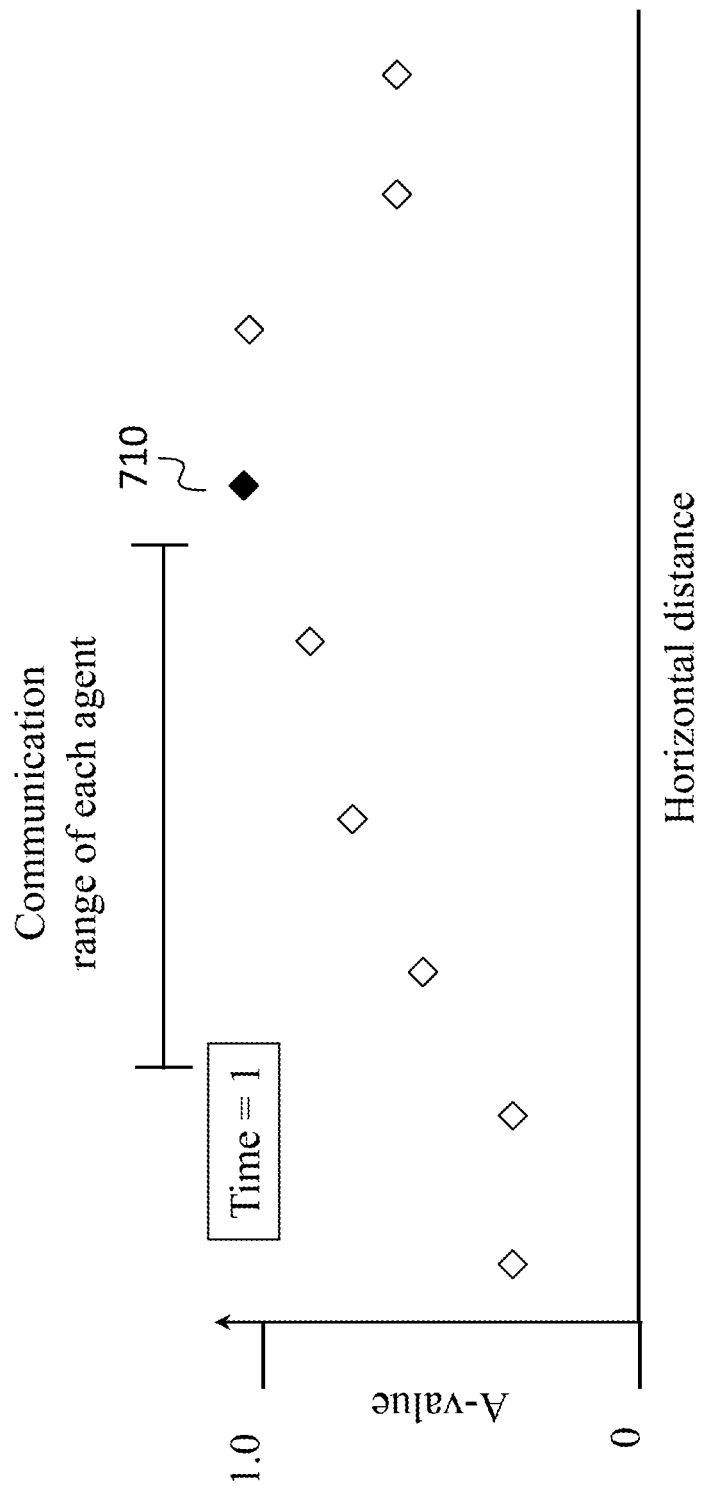
FIG. 7B is a graph of a parameter value as a function of distance, at a second point in time, according to an embodiment of the present invention.
Figure 7C:
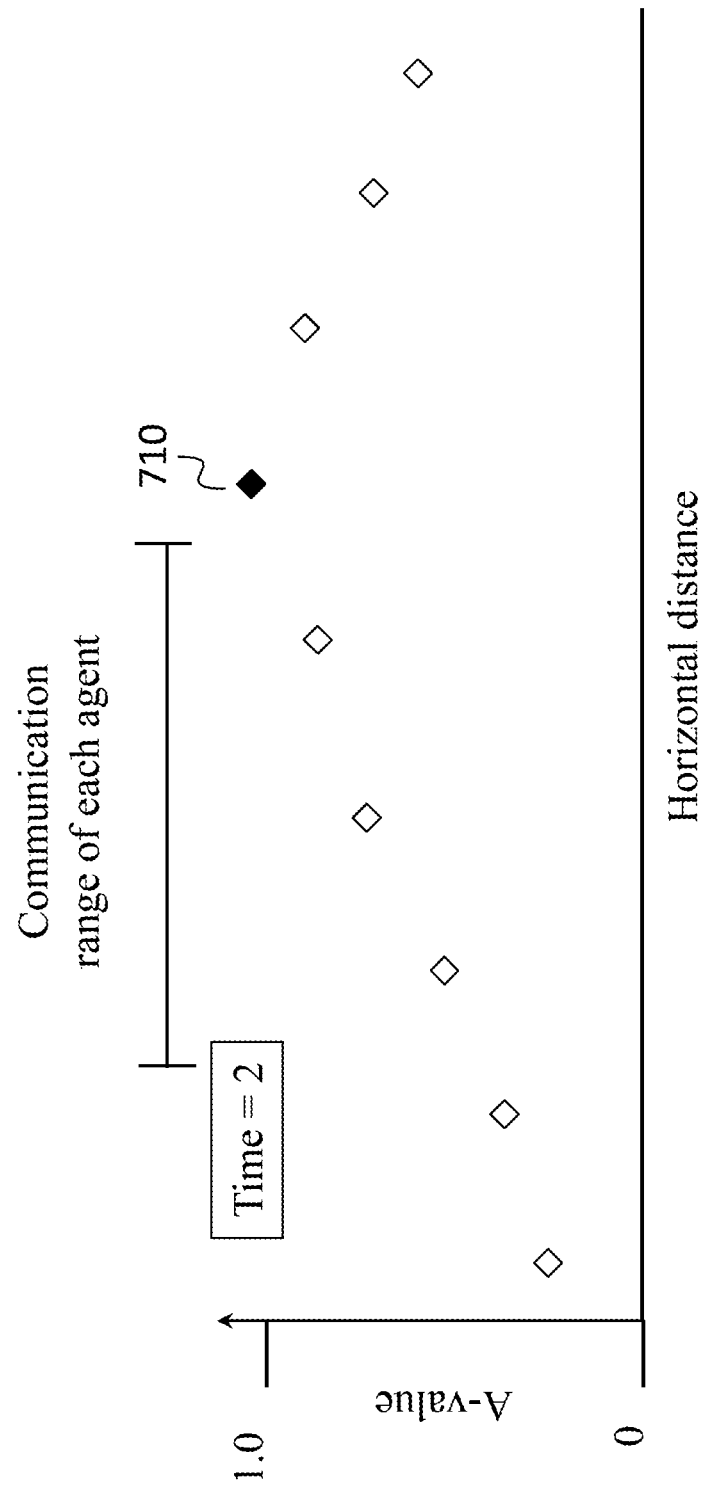
FIG. 7C is a graph of a parameter value as a function of distance, at a third point in time, according to an embodiment of the present invention.

In some embodiments, biasing of one or more A-values may be used to influence the behavior of the swarm. For example referring to FIGS. 7A-7C, if one robotic agent 710, the attractor, is biased toward a fixed high A-value and all others are biased toward a fixed low A-value, then over a few iterations of averaging the A-values may slope upward in the direction of the attractor on all sides of the attractor. The biasing may be implemented, for example, as follows. The attractor may have a fixed (e.g., positive) A-value (e.g., a value of 1), i.e., an A-value which is unaffected by the A-values of its close neighbors. Every other robotic agent may periodically substitute for its A-value the product of (i) an average (e.g., a straight average or a weighted average) of the A-values of its close neighbors and (ii) a cooling rate factor that is between 0 and 1 and close to 1, e.g., 0.95 The calculation of A-values by this process may be analogous to the time evolution of temperature (with the attractor being analogous to a heat source and the other robotic agents being analogous to heat sinks), under the effects of diffusion, according to the heat equation. Accordingly the set of A-values may progress toward a solution in which the attractor has the largest A-value and the gradient everywhere points generally toward the attractor. The steepness of the slope (i.e., the magnitude of the gradient) may depend on several factors (e.g., the spacing between robotic agents, the communication radius, the update rate, and the cooling rate factor).

Figure 8A:
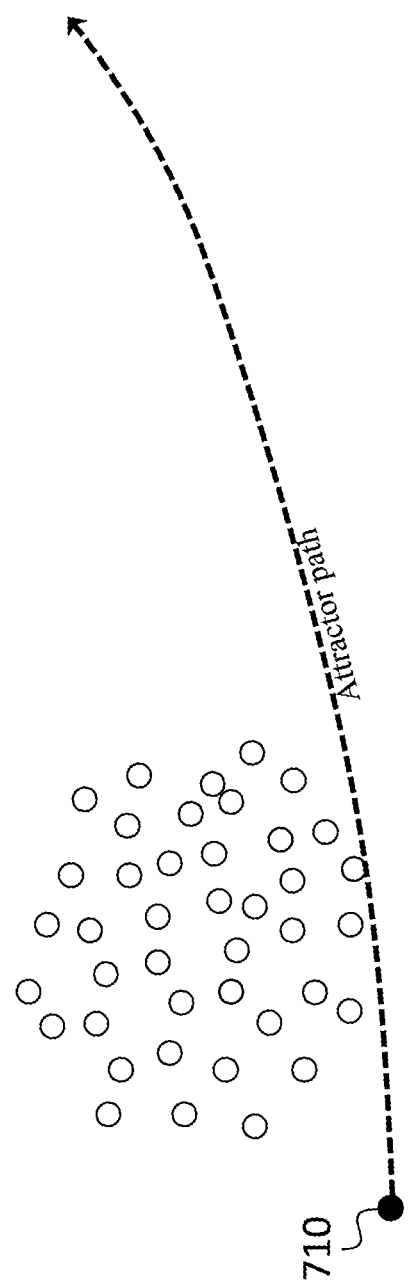
FIG. 8A is a schematic plan view of a swarm of robotic agents, at a first point in time, according to an embodiment of the present invention.
Figure 8B:
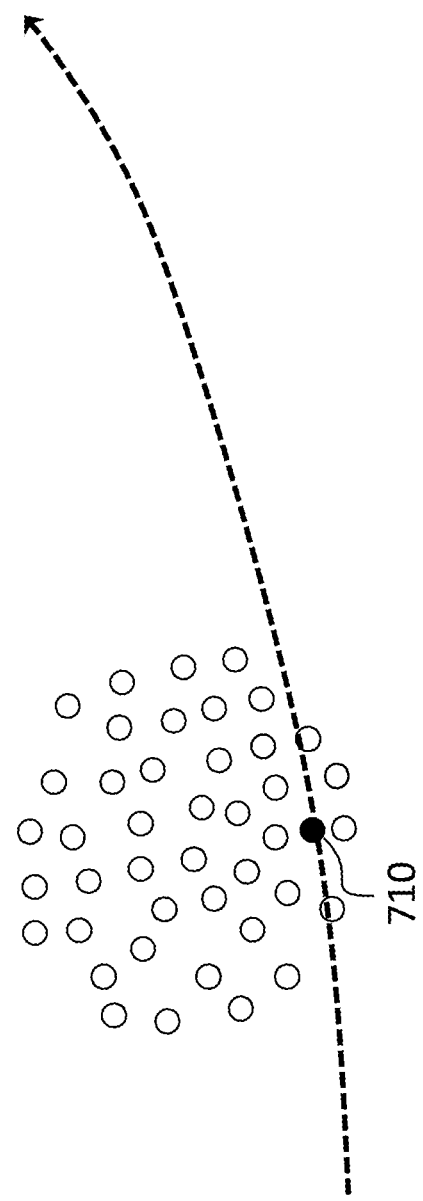
FIG. 8B is a schematic plan view of a swarm of robotic agents, at a second point in time, according to an embodiment of the present invention.
Figure 8C:
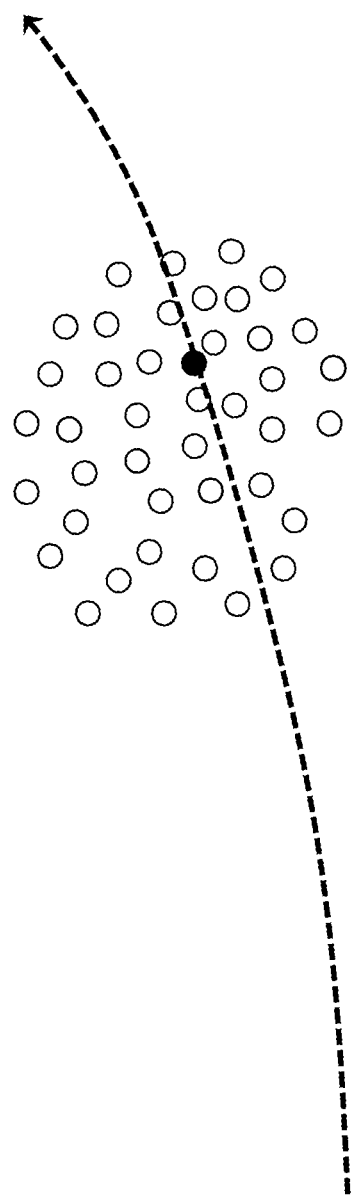
FIG. 8C is a schematic plan view of a swarm of robotic agents, at a third point in time, according to an embodiment of the present invention.
Figure 8D:
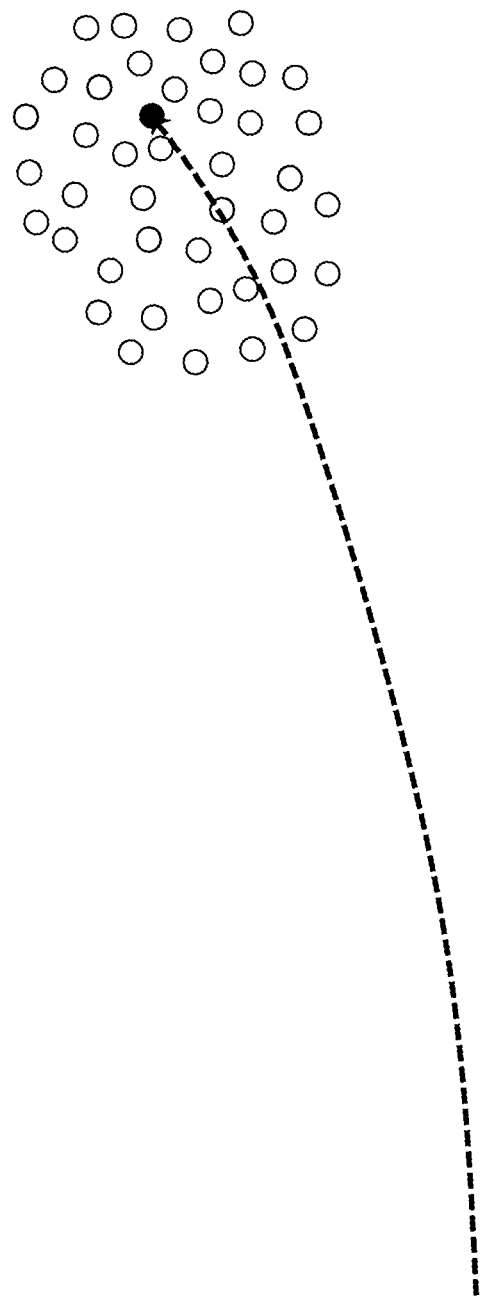
FIG. 8D is a schematic plan view of a swarm of robotic agents, at a fourth point in time, according to an embodiment of the present invention.

If the algorithm for calculating the resultant virtual force vector is suitably modified the entire swarm may be caused to "migrate" or move as a unit. For example, instead of being simply a vector sum of virtual forces from close neighbors, as in the embodiment of FIGS. 4A and 4B, a further component proportional to the gradient of a parameter of each robotic agent (e.g., proportional to the gradient of the A-value) may be added to the virtual forces calculated for the close neighbors, to form the resultant virtual force vector. Referring to FIG. 8A, if each robotic agent other than the attractor employs the virtual force of FIGS. 4A and 4B, then when the attractor is out of communication range of the remainder of the robotic agents (as shown in FIG. 8A), these robotic agents may remain in place, in a group. The attractor may also be a controllable agent, and it may be driven along the path shown as a dashed line in FIG. 8A. Once the attractor comes within communication range of the remainder of the robotic agents (as shown in FIG. 8B) a gradient forms within the A-values and spreads across the swarm. Once the gradient has formed, each robotic agent may respond with a motive force in an up-gradient direction, as a result of which all of the other robotic agents in the swarm may tend to move toward the attractor, and may gather around the attractor, as shown in FIG. 8C. Referring to FIG. 8D, the swarm may remain gathered around the attractor as it continues moving along its independently controlled path.

Although the two operations, averaging and biasing, may take place locally, this system and method may rapidly form a consistent, reliable topography of A-values across the whole swarm. Any robotic agent may then measure this topography (e.g., using the method described in the context of FIGS. 5A-5C) and use it to determine the general direction toward the attractor. In one embodiment, each robotic agent may simply use the up-slope direction of the gradient, regardless of its magnitude, and apply a fixed motive force in that direction. By this method the entire group may swarm around the attractor, and each robotic agent may continuously update its resultant virtual force vector appropriately even as the attractor moves.

Figure 9A:
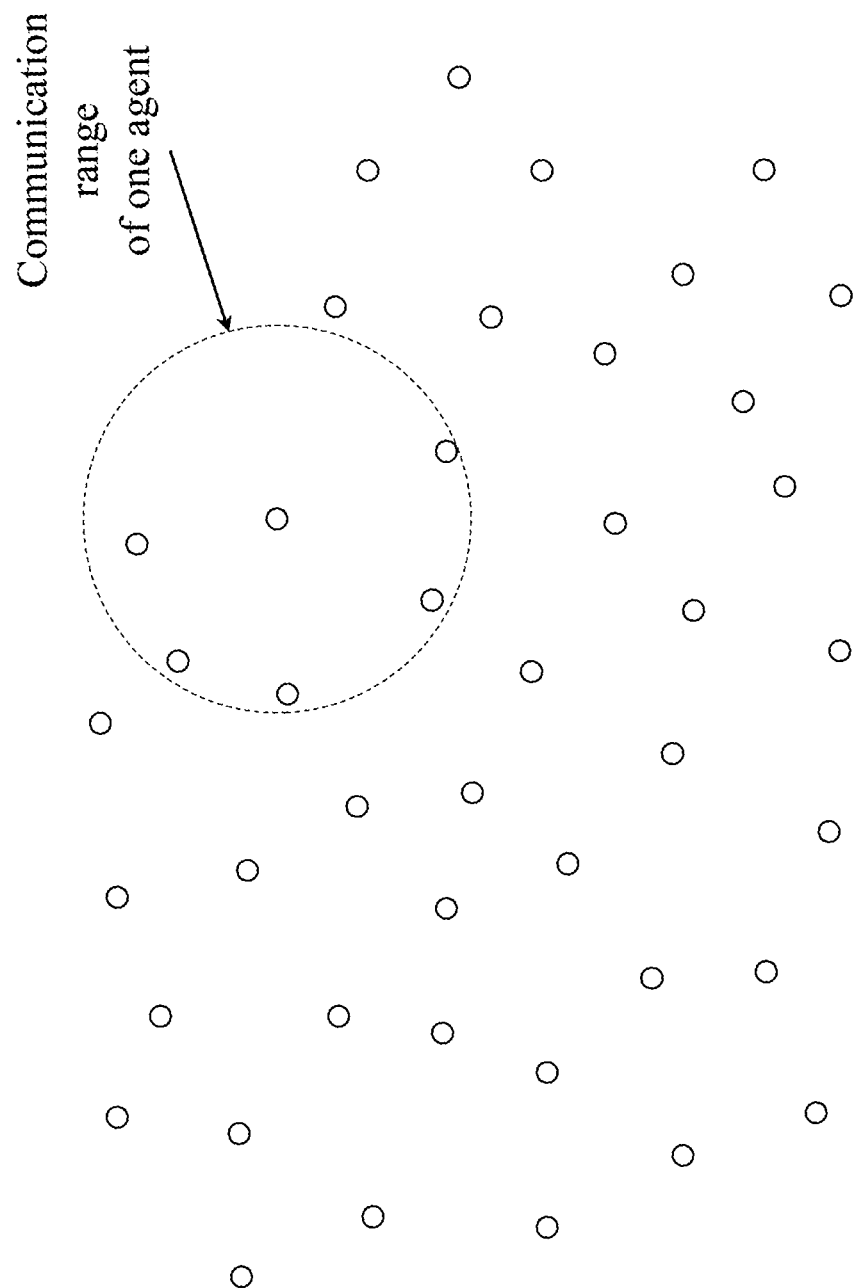
FIG. 9A is a schematic plan view of a swarm of robotic agents, according to an embodiment of the present invention.
Figure 9B:
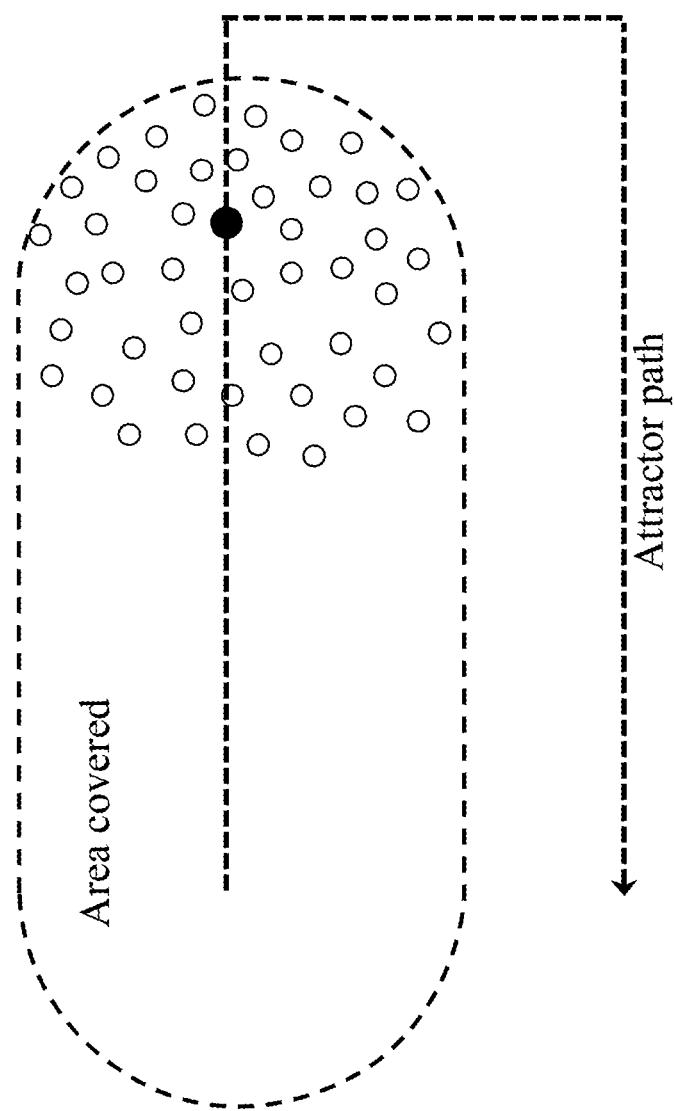
FIG. 9B is a schematic plan view of a swarm of robotic agents, according to an embodiment of the present invention.

The A-value may also be used in embodiments that relate to incorporating environmental readings. In one embodiment, referred to herein as a "search and gather" process, the robotic agents first spread out to detect an object of interest (e.g. an airplane's "black box"), and then gather around the target object. For example, referring to FIG. 9A, a swarm may spread out to its maximum width by having all robotic agents separate at close to their communication range. This method allows the swarm to cover a relatively large area. The configuration may however be relatively fragile, because small changes in separation or in the communication range (e.g., as a result of waves or of depletion of batteries) may result in contact being lost. In another process, illustrated in FIG. 9B, the swarm may hold a tighter spacing, achieving good redundancy, and then be guided to cover an area when the central controller commands a single attractor to follow a prescribed path (in a manner similar to that illustrated in FIGS. 8A-8D). A swarm may have advantages over a single vehicle because it may be capable of covering a large area thoroughly and quickly without having to move very fast.

Figure 10A:
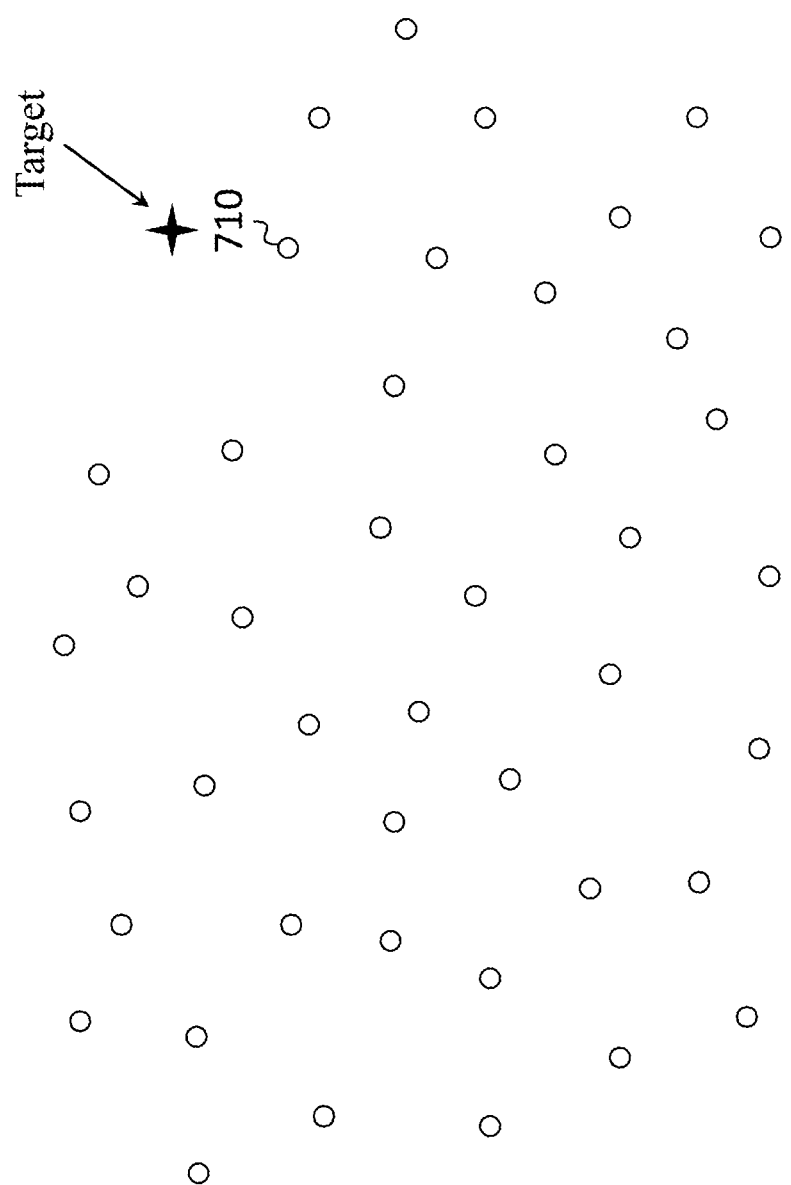
FIG. 10A is a schematic plan view of a swarm of robotic agents, at a first point in time, according to an embodiment of the present invention.
Figure 10B:
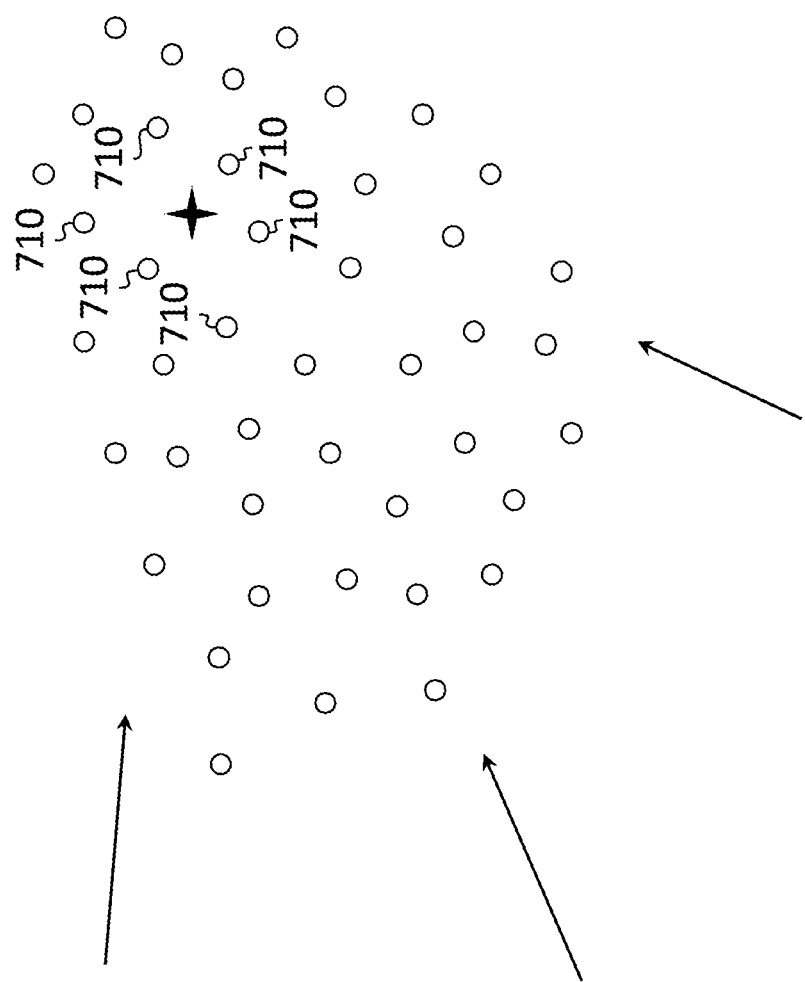
FIG. 10B is a schematic plan view of a swarm of robotic agents, at a second point in time, according to an embodiment of the present invention.

When a robotic agent has found a target, it may take on a set or pre-determined high A-value and become an attractor 710, as illustrated in FIG. 10A. Through A-value averaging a gradient may then form over the remainder of the swarm, that may then guide the rest of the group to the target. The system of gradient formation and smoothing may also be effective when there are multiple high A-value attractors 710, as illustrated in FIG. 10B. Over time the large group of robotic agents may encircle the smaller group of attractors, which themselves will be centered on the target. In these situations, the group's physical behavior, which may be remotely observable, may be used to identify the target location.

Figure 11A:
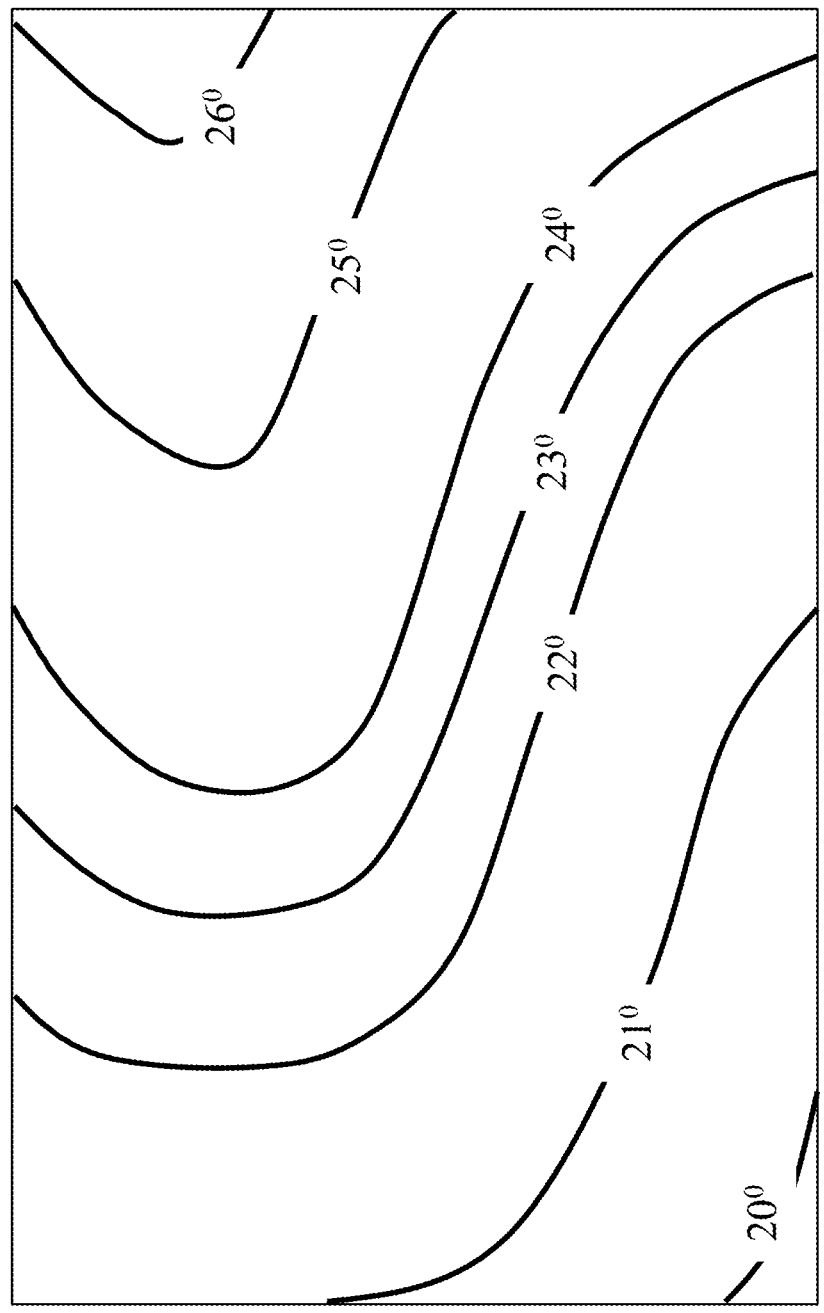
FIG. 11A is a plan view of a collection of isotherms, according to an embodiment of the present invention.
Figure 11B:
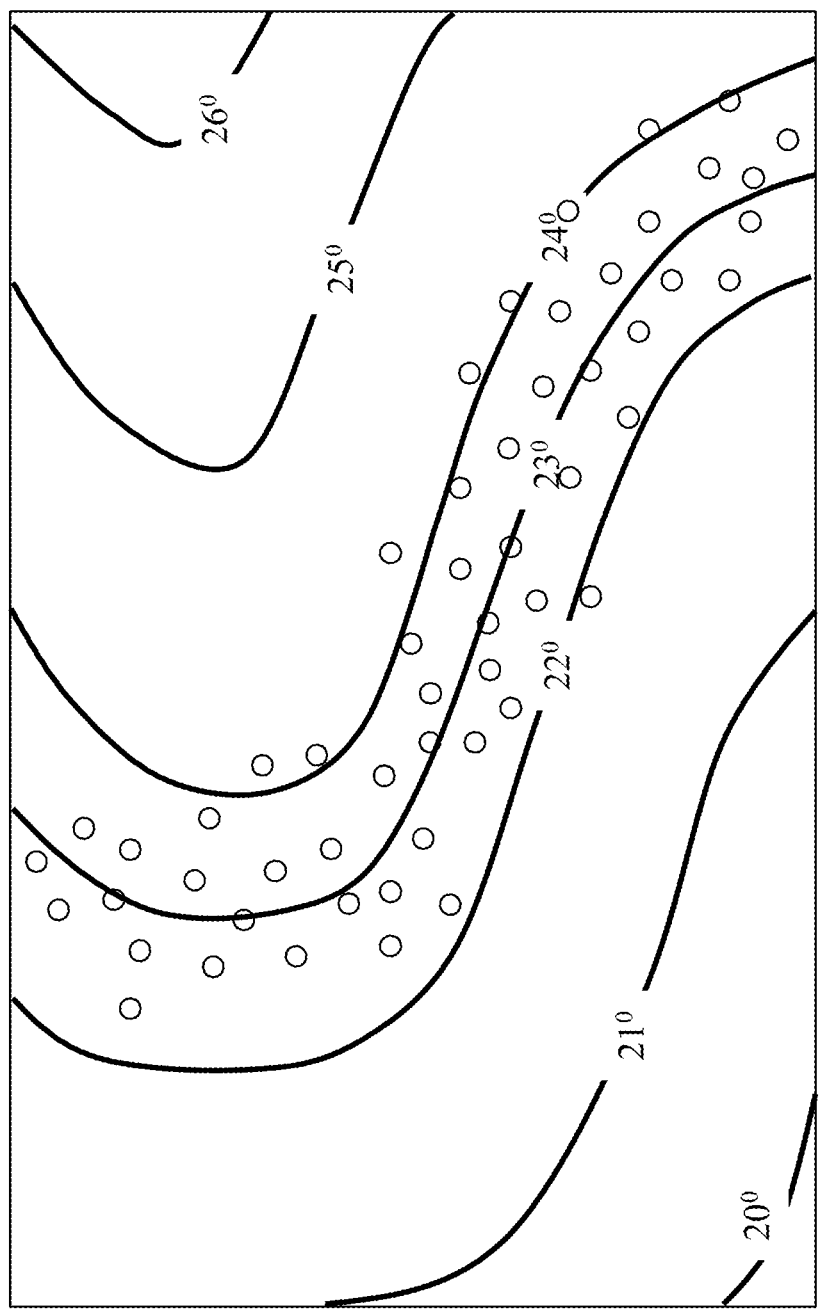
FIG. 11B is a schematic plan view of a swarm of robotic agents, according to an embodiment of the present invention.

Using similar processes, a swarm may be used to map a gradient, e.g., in an environmental parameter. The temperature, for example may be such an environmental parameter and is shown in FIG. 11A with isotherms. Tighter spacing of isotherms indicates a region of higher temperature gradients. Referring to FIG. 11B, when robotic agents are equipped to communicate their local environmental readings, then each robotic agent may use that distributed information to influence its A-value calculations. In this example each robotic agent biases its A-value based on the magnitude of the gradient of local temperatures (which may be estimated, for example, as explained above with reference to FIGS. 5A-5C). Where the magnitude of the gradient is greatest the A-values may tend to be greatest, and the swarm may accordingly move toward those areas, to concentrate at the high gradient regions. Such regions, the irregular shapes of which may make them difficult to map using single sensing vehicles, may be important locations for biological activity in the ocean. Because all the behavior of the swarm autopilot is local and autonomous, the swarm may be capable of tracking a high gradient region regardless of the complexity of its shape.

Figure 12A:
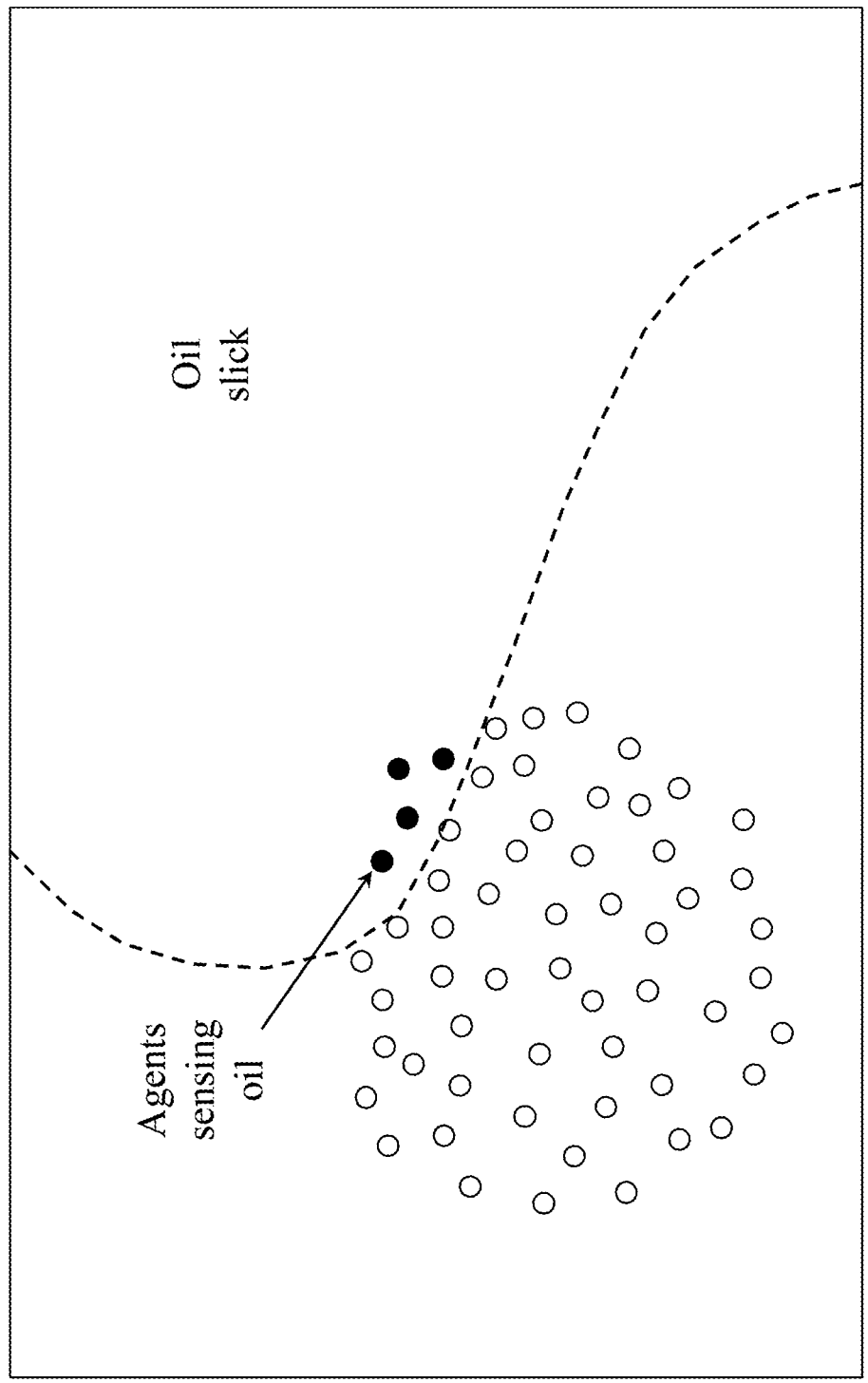
FIG. 12A is a schematic plan view of a swarm of robotic agents at an edge of an oil slick, at a first point in time, according to an embodiment of the present invention.
Figure 12B:
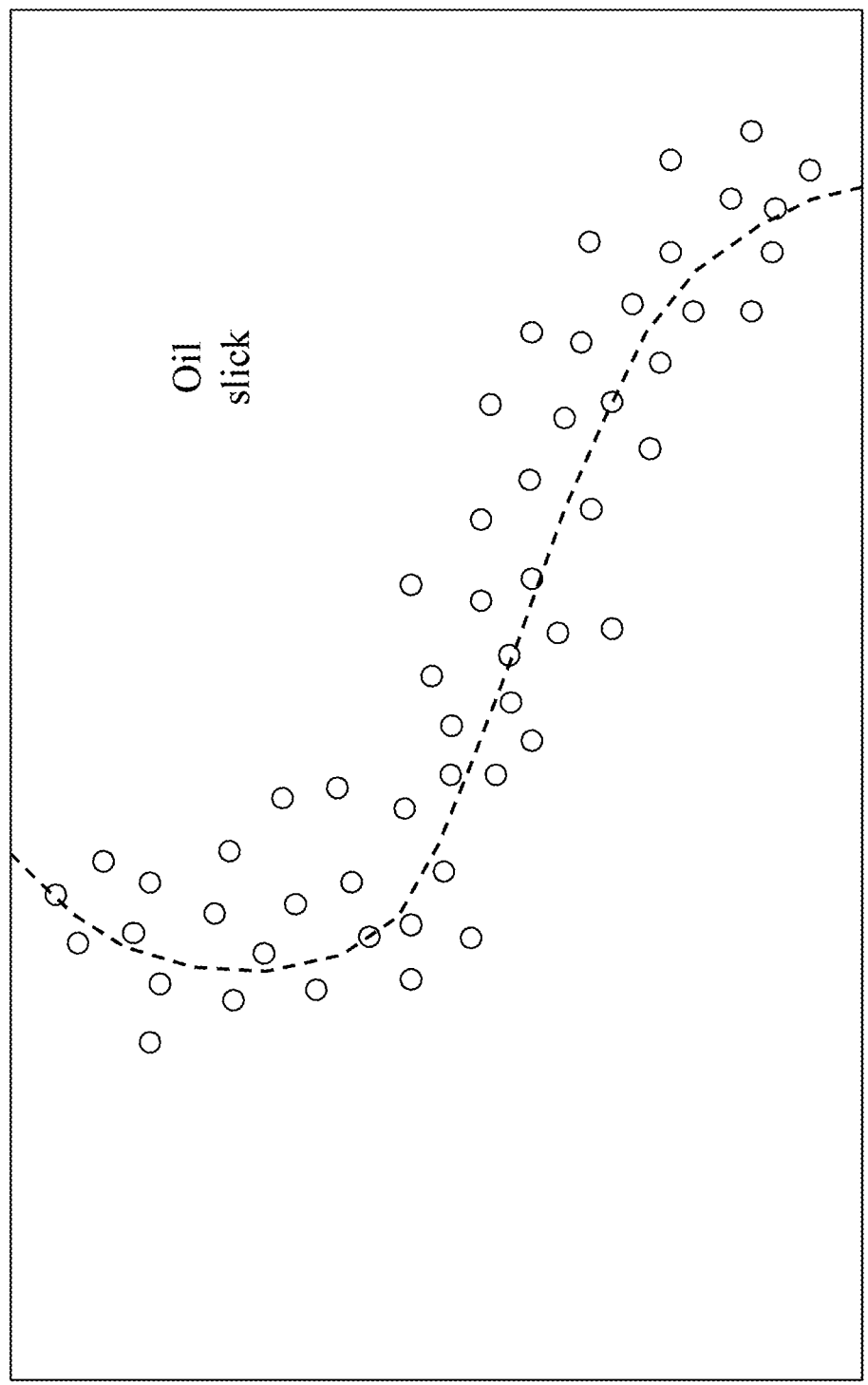
FIG. 12B is a schematic plan view of a swarm of robotic agents at an edge of an oil slick, at a second point in time, according to an embodiment of the present invention.

In another embodiment, a swarm may be configured to map a discrete boundary, such as the edge of an oil slick, as illustrated in FIG. 12A, in a behavior referred to as "edge-tracking". Each robotic agent may sense one of two discrete environmental conditions, i.e., it may sense either "oil" or "no oil". Attraction toward the boundary may be achieved in a manner similar to that of FIG. 11B even when sensing is binary, as in this example. Robotic agents that have some neighbors on both sides of the boundary may recognize the high environmental gradient and take on an accordingly high A-value. For example, each robotic agent may estimate a gradient (for example, as explained above with reference to FIGS. 5A-5C), and bias its A-value according to the magnitude of the gradient, so that the A-values of robotic agents on or near the boundaries may be higher than those of robotic agents farther from the boundaries, resulting in a tendency of the robotic agents to move toward the boundary. Through averaging a gradient in A-values may develop, even drawing in robotic agents that start far away from the boundary. The overall swarm may then distribute itself along the boundary, and the position of the swarm may become a map of the edge of the oil slick. In this example, the autopilot may inform the entire distributed group of the direction toward a feature that is only directly sensed by a few individual robotic agents.

In this manner, by biasing A-values based on the local variation in environmental readings, rather than on the absolute value of those readings, the autopilot can drive the swarm to spontaneously migrate toward, and spread out along, important structures in the environment.

In these examples, the biasing of the A-value according to a gradient may be performed, for example, by executing, in each robotic agent, the following algorithm for updating the A-value:

$$A_{i,n} = k\overline{A}_{i,n-1} + G_{i,n-1}$$

where $A_{i,n}$ is the new A-value (i.e., the A-value at time step n) of the $i^{th}$ robotic agent, k is the cooling rate factor, $\overline{A}_{i,n-1}$ is the average of the A-values, at the previous time step, of all of the robotic agent within communication range of the $i^{th}$ robotic agent, and is the magnitude of the gradient of environmental readings at the $i^{th}$ robotic agent at the previous time step. Once the A-values have been determined, each robotic agent may estimate a local gradient of the A-value (again, using a method analogous that described in the context of FIGS. 5-5C) and calculate a resultant virtual force vector as a weighted vector sum of (i) the A-value gradient and (ii) the vector sum of virtual forces from close neighbors, calculated as in the embodiment of FIGS. 4A and 4B.

In some embodiments, the swarm autopilot is a concept that bridges the gap between a unified goal and a distributed system. It is a system and/or method of creating a consistent, unified, useful, predictable response from the whole swarm, despite the lack of unified computation. The diffusion of A-values creates a smooth global information structure that individual robotic agents may access locally to determine their respective course of action.

A swarm autopilot according to embodiments of the present invention may be useful in situations where the system is too complex (e.g., there are too many robotic agents) or too remote for centralized control (e.g., when it is infeasible to communicate directly with all robotic agents). A swarm autopilot according to embodiments of the present invention may be implemented in a set of robotic agents when each robotic agent is capable of (i) sensing the spatial location of close neighbors, (ii) discerning the A-values of those neighbors (iii) updating its own A-value and (iv) moving in alignment with the local gradient of A-values.

The swarm autopilot has been described above for the example of ocean surface vehicles using radio communications to share GPS information and A-values, but the invention is not limited thereto, and the method lends itself to a range of other distributed embodiments. For example, a submerged three-dimensional (3D) swarm of autonomous underwater vehicles may be formed by vehicles capable of operating underwater. All the methods described above for two-dimensional (2D) swarming may also be employed in the context of 3D swarming, including swarm-the-attractor, search-and-gather and edge-tracking. As such, an autopilot according to embodiments of the present invention may be useful for submerged swarms.

Communication may be challenging in underwater settings because radio frequency and microwave electromagnetic waves, that, on the surface, may carry satellite GPS signals and communications between the robotic agents, may be rapidly attenuated under water. Acoustic signaling or signaling using light may be used instead. For example, each robotic agent may transmit its A-value by making sound at a specific pitch (or emitting light at a specific frequency (or wavelength) or pulsed at a specific rate). A neighboring robotic agent may then receive the A-value as encoded in this pitch, and may use the strength and direction of the incoming signal as proxies for (i.e., to infer) range and bearing. If each robotic agent also has the ability to calculate the average of the incoming pitches and to adjust its own pitch correspondingly, the swarm of robotic agents may be able to embody a distributed autopilot according to embodiments of the present invention.

In some such embodiments it is unnecessary for a robotic agent to perform sophisticated mathematical calculations in this sort of system. A more direct reflexive response may be sufficient to implement an autopilot; for example each robotic agent may be configured to be slightly more attracted toward higher-pitched sounds (higher A-values), to be slightly more repelled from lower-pitched sounds (lower A-values), and to adjust its pitch toward the average pitch around it. In this way a robotic agent may tend to move in the up-gradient direction without actually having to calculate that gradient.

When alternate sensing or communication techniques like acoustics and/or light are employed it may be possible to use the autopilot with extremely small robotic agents, potentially small enough to be used inside a living body, such as a nano-scale vehicle capable of mobility, sensing, signaling and processing. If designed with the appropriate capabilities (e.g., those described above, including sensing range, bearing and parameter value of close neighbors (either directly or by proxy), determining the parameter gradient, being able to follow that gradient, and providing an average parameter value to the close neighbors) it may be possible to use the autopilot to guide large groups using any of the control methods described above.

Chemical signaling is common in biological systems and may be incorporated in a nano-robotic system to make the autopilot work. Sensed variations in the composition of emitted chemicals may be taken into account when calculating A-values. If robotic agents are able to directly sense local gradients in chemical concentrations, they may be configured to move towards neighbors signaling higher A-values.

The swarm autopilot concept may be particularly useful in a microscopic environment where, due to size, numbers and the in situ application, control of individual robotic agents may be infeasible. In such a situation, the swarm may still be controlled through the use of attractors, and external equipment such as magnetic resonance imaging (MRI) may monitor the behavior of the group.

The creation of a smooth, sloping topography of A-values may be useful in situations beyond the control of a swarm of robotic agents. For example, a distributed sensor array may be deployed to monitor a large area for an anomalous signal (in a configuration analogous to that of FIG. 9A). For example, low-energy acoustic sensors may be distributed over a large field. Each sensor may be equipped with a GPS and low-power radio. Each sensor may be capable of communicating with close neighbors, but not over long distances. Each sensor may store, and periodically update, an A-value; when one sensor detects a signal of interest it may take on the role of an attractor (as in FIG. 10A). Through local communication and averaging, a smooth topography of A-values may spread across the entire sensor array, making it possible to determine the direction toward the attractor sensor from any other sensor.

In light of the above, in various embodiments an auto pilot employing an artificial parameter (the A-value) may be simply configured to guide various behaviors, such as maintaining the separation between robotic agents, and causing the swarm to move, e.g., to follow an attractor, or to gather on a feature, such as a region having a high temperature gradient.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a swarm autopilot have been specifically described and illustrated herein, many modifications and variations will be apparent to those skilled in the art. Accordingly, it is to be understood that a swarm autopilot constructed according to principles of this invention may be embodied other than as specifically described herein. The invention is also defined in the following claims, and equivalents thereof.

What is claimed is:

1. A method for controlling a plurality of robotic agents, the method comprising:
   storing, in each of the robotic agents, a respective first parameter value;
   sending, by a first robotic agent of the plurality of robotic agents, the respective first parameter value to each of a plurality of first close neighbor robotic agents of the plurality of robotic agents, each of the first close neighbor robotic agents having a distance, to the first robotic agent, less than a threshold distance,
   receiving, by the first robotic agent, a respective first parameter value from each of the first close neighbor robotic agents,
   calculating, by the first robotic agent, a new first parameter value, the calculating comprising calculating an average of:
     the first parameter value of the first robotic agent; and
     the received first parameter values;
   updating the first parameter value of the first robotic agent to equal the new first parameter value;
   calculating, by the first robotic agent, an estimated gradient of:
     the first parameter value of the first robotic agent; and
     the received first parameter values;
   calculating, by the first robotic agent, a resultant virtual force vector as a sum of one or more vector quantities including the estimated gradient; and
   generating, by the first robotic agent, a net thrust force, on the first robotic agent, parallel to the resultant virtual force vector.

2. The method of claim 1, further comprising setting, by a second robotic agent different from the first robotic agent, the respective first parameter value of the second robotic agent to a value received from a central controller.

3. The method of claim 2, further comprising, moving, by the second robotic agent, in a direction along a path received by the second agent from a central controller.

4. The method of claim 1, wherein each of the robotic agents is configured to measure a first value of an environmental parameter.

5. The method of claim 4, wherein the calculating of the first new parameter value further comprises calculating a function of:

the average of:
  the first parameter value of the first robotic agent; and
  the received first parameter values; and
the first value of the environmental parameter.

6. The method of claim 4, further comprising receiving, by the first robotic agent, a respective value of the environmental parameter from each of the first close neighbor robotic agents, wherein
the calculating of the first new parameter value further comprises calculating a function of:
  the average of:
    the first parameter value of the first robotic agent; and
    the received first parameter values; and
  the received values of the environmental parameter.

7. The method of claim 6, wherein the function is a weighted sum of:
the average of:
  the first parameter value of the first robotic agent; and
  the received first parameter values; and
a magnitude of an estimated gradient in:
  the first value of the environmental parameter; and
  the received values of the environmental parameter.

8. The method of claim 1, wherein:
the sending of the respective first parameter value comprises transmitting the respective first parameter value by wireless communication, and
the receiving of the respective first parameter values comprises receiving the respective first parameter values by wireless communication.

9. The method of claim 8, wherein the threshold distance is less than or equal to a range of the wireless communication.

10. The method of claim 1, wherein the average is a weighted average.

11. The method of claim 1, wherein the average is a weighted average, each term of the weighted average being weighted in inverse proportion to a distance to a first close neighbor robotic agent, of the plurality of first close neighbor robotic agents, from which the received respective first parameter value was received.

12. The method of claim 1, wherein the calculating of the first new parameter value further comprises multiplying by a cooling rate factor, the cooling rate factor being a number greater than 0.01 and less than 0.99.

13. The method of claim 1, wherein the calculating of the first new parameter value further comprises calculating, for a first close neighbor robotic agent, of the plurality of first close neighbor robotic agents:
  a distance between the first robotic agent and the first close neighbor robotic agent;
  a virtual force vector corresponding to the first close neighbor robotic agent, the virtual force vector having a magnitude that is a function of the distance between the first robotic agent and the first close neighbor robotic agent, and having a direction along a straight line connecting the first robotic agent and the first close neighbor robotic agent, the virtual force vector corresponding to:
  a repulsive force when the distance between the first robotic agent and the first close neighbor robotic agent is less than an equilibrium distance; and
  an attractive force when the distance between the first robotic agent and the first close neighbor robotic agent is greater than the equilibrium distance.

* * * * *